US008958609B2

(12) United States Patent
Yasukawa et al.

(10) Patent No.: US 8,958,609 B2
(45) Date of Patent: Feb. 17, 2015

(54) METHOD AND DEVICE FOR COMPUTING DEGREE OF SIMILARLY BETWEEN DATA SETS

(75) Inventors: Nobuyuki Yasukawa, Tokyo (JP); Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 561 days.

(21) Appl. No.: 13/265,219

(22) PCT Filed: Apr. 7, 2010

(86) PCT No.: PCT/JP2010/002539
§ 371 (c)(1),
(2), (4) Date: Dec. 14, 2011

(87) PCT Pub. No.: WO2010/122721
PCT Pub. Date: Oct. 28, 2010

(65) Prior Publication Data
US 2012/0082370 A1    Apr. 5, 2012

(30) Foreign Application Priority Data

Apr. 22, 2009  (JP) .................................. 2009-104495

(51) Int. Cl.
*G06K 9/62*      (2006.01)
*G06T 7/00*      (2006.01)
*G06K 9/00*      (2006.01)

(52) U.S. Cl.
CPC .......... *G06T 7/0028* (2013.01); *G06K 9/00288* (2013.01); *G06K 9/6215* (2013.01); *G06T 2207/10028* (2013.01); *G06T 2207/30201* (2013.01); *G06K 9/00201* (2013.01); *G06K 9/6247* (2013.01)

USPC ......................................................... 382/118
(58) Field of Classification Search
None
See application file for complete search history.

(56) References Cited

U.S. PATENT DOCUMENTS

| 6,681,034 B1* | 1/2004 | Russo .......................... 382/125 |
| 7,319,791 B1* | 1/2008 | Baldo et al. .................. 382/219 |
| 2003/0076985 A1* | 4/2003 | Moghaddam ................. 382/124 |

FOREIGN PATENT DOCUMENTS

| JP | 09-091443 | 4/1997 |
| JP | 2004-005303 | 1/2004 |

(Continued)

OTHER PUBLICATIONS

Written Opinion dated May 11, 2010 from related JP PCT/JP2010/002539 together with an English translation.

(Continued)

*Primary Examiner* — Brian P Werner
(74) *Attorney, Agent, or Firm* — Scully, Scott, Murphy & Presser, P.C.

(57) ABSTRACT

Provided is a matching device capable of improving the accuracy of the degree of similarly in the calculation of the degree of similarly between data sets. Element selection unit selects elements corresponding to each other between a first vector including a plurality of elements determined based on first data and a second vector including a plurality of elements determined based on second data. Similarity degree calculation unit calculates a score of the degree of similarly between the first data and the second data from the elements selected from the first vector and the second vector. Score correction unit corrects the score calculated by the similarity degree calculation unit so that the increment of the score increases with the increase in the amount of data used for the calculation of the degree of similarly.

24 Claims, 28 Drawing Sheets

(56) References Cited

FOREIGN PATENT DOCUMENTS

| JP | 2004-086929 | 3/2004 |
| JP | 2004-302581 | 10/2004 |
| JP | 2008-152789 | 7/2008 |
| JP | 2008-204200 | 9/2008 |
| WO | WO 2005/038716 A1 | 4/2005 |
| WO | WO 2006/087789 A1 | 8/2006 |

OTHER PUBLICATIONS

Turk, Matthew A. et al., "Face Recognition Using Eigenfaces", Computer Vision and Pattern Recognition (1991), Proceedings of CVPR '91, p. 586-591.

Blanz, Volker et al., "A Morphable Model for the Synthesis of 3D Faces", ACM SIGGRAPH 99, Proceedings of the 26th Annual Conference on Computer Graphics and Interactive Techniques (1999), pp. 187-194.

Ishiyama, Rui et al., "Face Recognition Under Variable Pose and Illumination Conditions Using 3D Facial Appearance Models", Systems and Computers in Japan (2007), vol. 38, Issue 2, pp. 57-70.

Brunelli, Roberto et al., "Face Recognition: Features versus Templates", IEEE Transactions on Pattern Analysis and Machine Intelligence (1993), vol. 15, Issue 10, pp. 1042-1052.

Koschan, Andreas, "A Comparative Study on Color Edge Detection", Institute for Technical Informatics, FR 3-11, Dec. 1995, vol. III, pp. 574-578.

Ishiyama, Rui et al., "Absolute Phase Measurements using Geometric Constraints between Multiple Cameras and Projectors", Optical Society of America, Applied Optics (2007), vol. 47, No. 17, pp. 3528-3538.

Ishiyama, Rui et al., "Fast and Accurate Facial Pose Estimation by Aligning a 3D Appearance Model", Proceeding of the $17^{th}$ International Conference on Pattern Recognition (ICPR'04), 2004.

Lanitis, Andreas, "Person Identification From Heavily Occluded Face Images", 2004 ACM Symposium on Applied Computing (2004), pp. 5-9.

\* cited by examiner

FIG. 3

|  |  | D | A |
|---|---|---|---|
| FEATURE VECTOR OF PERSON a | FEATURE VECTOR OF PERSON b | D1 | A1 |
| FEATURE VECTOR OF PERSON c | FEATURE VECTOR OF PERSON d | D2 | A2 |
| FEATURE VECTOR OF PERSON e | FEATURE VECTOR OF PERSON a | D3 | A3 |
| ⋮ | ⋮ | ⋮ | ⋮ |
| FEATURE VECTOR OF PERSON a | FEATURE VECTOR OF PERSON a | D4 | A4 |
| FEATURE VECTOR OF PERSON b | FEATURE VECTOR OF PERSON b | D5 | A5 |
| FEATURE VECTOR OF PERSON c | FEATURE VECTOR OF PERSON c | D6 | A6 |
| ⋮ | ⋮ | ⋮ | ⋮ |

○ : (D, A) DETERMINED BY USING SAME-PERSON FEATURE
     VECTOR PAIRS

△ : (D, A) DETERMINED BY USING DIFFERENT-PERSON FEATURE
     VECTOR PAIRS

○ : (D, A) DETERMINED BY USING SAME-PERSON FEATURE
    VECTOR PAIRS

△ : (D, A) DETERMINED BY USING DIFFERENT-PERSON FEATURE
    VECTOR PAIRS

FIG. 14

|     | -1 |     | 1 |
| (a) | -1 |     | 1 |
|     | -1 |     | 1 |

|     | P4 |     | P1 |
| (b) | P5 |     | P2 |
|     | P6 |     | P3 |

METHOD AND DEVICE FOR COMPUTING DEGREE OF SIMILARLY BETWEEN DATA SETS

TECHNICAL FIELD

The present invention relates to a matching device, a matching method and a matching program for executing the matching, and in particular, to a matching device, a matching method and a matching program for calculating the degree of similarly between data sets.

BACKGROUND ART

Various techniques to be used for face image recognition by a computer have been proposed. For example, a technique for performing the facial recognition by executing the principal component analysis to collected face images is described in Non-patent Literature 1.

Meanwhile, techniques have been proposed for generating various images of an object in cases where the direction of the object and the illumination are changed. In a technique described in Non-patent Literature 2, images of an object in cases where the direction and the illumination are changed are generated by measuring the three-dimensional shape of the object. When an image is generated from the three-dimensional shape, the position and posture of the three-dimensional shape are adjusted so that the difference in the degree of similarly to a target image decreases.

In a technique described in Non-patent Literature 3, a three-dimensional shape of an object is measured previously. An image approximate to the target image is generated from the three-dimensional shape of the object. The matching a two-dimensional image of the object in which the illumination/posture condition is unknown with the image approximate to the target image is performed.

When a two-dimensional image is generated from the three-dimensional shape of each object, positioning and adjusting posture is performed so that the difference in the degree of similarly to the target image decreases. In this process, the position and posture of the three-dimensional shape are adjusted so that parts where the difference from the target image is large are hidden. Consequently, the image is generated using only areas of the three-dimensional shape where the difference from the target image is small. Thus, the generated image tends to be small.

Patent Literature 1 and Non-patent Literature 4 describe methods for the calculation of the degree of similarly between face images. In the methods, the degree of similarly of each area in the images is calculated, the degrees of similarly are integrated after each weight is given to each degree of similarly, and a integrated degree of similarly is used.

Non-patent Literature 5 describes a technique for generating an image in which edge parts have been detected in an image.

Non-patent Literature 6 describes a technique for acquiring three-dimensional shape data of an object.

Non-patent Literature 7 describes a technique for estimating the posture (direction) of a three-dimensional face model that matches a face image.

Patent Literature 2 describes an image matching device which generates the base vectors of illumination variation space by performing the principal component analysis and generates an image approximate to an input image from the base vectors.

Non-patent Literature 8 describes a technique for determining hidden areas, where the face is hidden by other objects, in a face image.

CITATION LIST

Patent Literature

Patent Literature 1: JP-A-2008-152789
Patent Literature 2: JPP-A-2004-86929

Non-Patent Literature

Non-patent Literature 1: Matthew Turk, Alex Pentland, "Face Recognition Using Eigenfaces", Computer Vision and Pattern Recognition, Proceedings of CVPR'91, p. 586-591, 1991

Non-patent Literature 2: Volker Blanz, Thomas Vetter, "A Morphable Model for the Synthesis of 3D Faces", ACM SIGGRAPH 99, Proceedings of the 26th Annual Conference on Computer Graphics and Interactive Techniques, pp. 187-194, 1999

Non-patent Literature 3: Rui Ishiyama, Masahiko Hamanaka, Shizuo Sakamoto, "Face Recognition under Variable Pose and Illumination Conditions Using 3D Facial Appearance Models", Systems and Computers in Japan, volume 38, issue 2, pages 57-70, 2007

Non-patent Literature 4: Robert Brunelli, Tomaso Poggio, "Face Recognition: Features versus Templates", IEEE Transactions on Pattern Analysis and Machine Intelligence, volume 15, issue 10, pages 1042-1052, 1993

Non-patent Literature 5: Andreas Koschan, "A Comparative Study on Color Edge Detection", 1995

Non-patent Literature 6: Rui Ishiyama, Shizuo Sakamoto, Johji Tajima, Takayuki Okatani, Koichiro Deguchi, "Absolute Phase Measurements Using Geometric Constraints between Multiple Cameras and Projectors", Optical Society of America, APPLIED OPTICS Vol. 47, No. 17, 2007

Non-patent Literature 7: Rui Ishiyama, Shizuo Sakamoto, "Fast and Accurate Facial Pose Estimation by Aligning a 3D Appearance Model", Proceeding of the $17^{th}$ International Conference on Pattern Recognition (ICPR'04), 2004

Non-patent Literature 8: Andreas Lantis, "Person Identification from Heavily Occluded Face Images", 2004 ACM Symposium on Applied Computing, 2004

SUMMARY OF INVENTION

Technical Problem

In cases where the matching with a target image of a certain person is executed using a plurality of three-dimensional shapes measured previously, the degree of similarly calculated between the target image and a small composite image generated using the three-dimensional shape of a different person tends to be higher than the degree of similarly calculated between the target image and a large composite image generated using the three-dimensional shape of the same person. Consequently, the matching fails in many cases.

Such a problem occurs also when the matching is executed using two-dimensional images acquired by photographing. FIG. 28 is a conceptual diagram showing an example of a case where a correct matching result can not be obtained when square measures used for the matching are small. An image of a person "a" (registered image a) and an image of a person "b" (registered image b) have been registered previously. The registered image a of the person a does not particularly have a hidden part, whereas the registered image b of the person b has a hidden part hidden by eyeglasses, for example. The hiding is sometimes called occlusion, noise, etc. The facial expression of each person in the images is not necessarily the same; it is assumed that a mouth part of a person's image is different from a mouth part of another person's image. A matching image a of the person a is inputted as an image to be matched with the registered images. For the matching between the registered image a and the matching image a, the degree of similarly may be calculated between the whole areas of the images. In contrast, for the registered image b, it is possible to detect parts where the hiding has occurred and calculate the degree of similarly between the registered image b and the matching image a only in an area excluding the hidden parts. If the degree of similarly is calculated in this way, the degree of similarly calculated using the partial area of the registered image b can become higher than that calculated using the whole area of the registered image a, and consequently, the matching image a can be judged as an image of the person b.

In the methods described in the Patent Literature 1 and the Non-patent Literature 4, the degree of similarly between images is calculated by taking account of the degree of similarly in each area of the images. These methods, weighting the degree of similarly in each area, are employable in cases where areas usable for the matching are known beforehand. In general, however, the positions and sizes of the areas usable for the matching (areas other than the hidden parts) are not always the same in the registered image and the matching image. Thus, the methods of the Patent Literature 1 and the Non-patent Literature 4 are unusable.

Further, while the calculation of the degree of similarly between images has been described above as an example, the tendency of the degree of similarly to be calculated higher with the decrease in the amount of information used for the similarity degree calculation appears also when the degree of similarly is calculated between data sets other than images.

It is therefore the primary object of the present invention to provide a matching device, a matching method and a matching program capable of improving the accuracy of the degree of similarly in the calculation of the degree of similarly between data sets.

Solution to Problem

A matching device in accordance with the present invention comprises: element selection means which selects elements corresponding to each other between a first vector including a plurality of elements determined based on first data and a second vector including a plurality of elements determined based on second data; similarity degree calculation means which calculates a score of the degree of similarly between the first data and the second data from the elements selected from the first vector and the second vector; and score correction means which corrects the score calculated by the similarity degree calculation means so that the increment of the score increases with the increase in the amount of data used for the calculation of the degree of similarly.

A matching method in accordance with the present invention comprises the steps of: selecting elements corresponding to each other between a first vector including a plurality of elements determined based on first data and a second vector including a plurality of elements determined based on second data; calculating a score of the degree of similarly between the first data and the second data from the elements selected from the first vector and the second vector; and correcting the calculated score so that the increment of the score increases with the increase in the amount of data used for the calculation of the degree of similarly.

A matching program in accordance with the present invention causes a computer to execute: an element selection process of selecting elements corresponding to each other between a first vector including a plurality of elements determined based on first data and a second vector including a plurality of elements determined based on second data; a similarity degree calculation process of calculating a score of the degree of similarly between the first data and the second data from the elements selected from the first vector and the second vector; and a score correction process of correcting the score calculated by the similarity degree calculation process so that the increment of the score increases with the increase in the amount of data used for the calculation of the degree of similarly.

Advantageous Effects of the Invention

According to the present invention, the accuracy of the degree of similarly can be improved in the calculation of the degree of similarly between data sets.

BRIEF DESCRIPTION OF DRAWINGS

FIG. 3 It depicts an explanatory drawing showing an example of evaluation values D and numbers A determined for multiple pairs of feature vectors of different people and multiple pairs of feature vectors of the same person.

FIG. 11 It depicts an explanatory drawing schematically showing a process executed by a matching feature selecting means 3a.

FIG. 14 It depicts an explanatory drawing showing an example of a filter.

DESCRIPTION OF EMBODIMENTS

Figure 1:
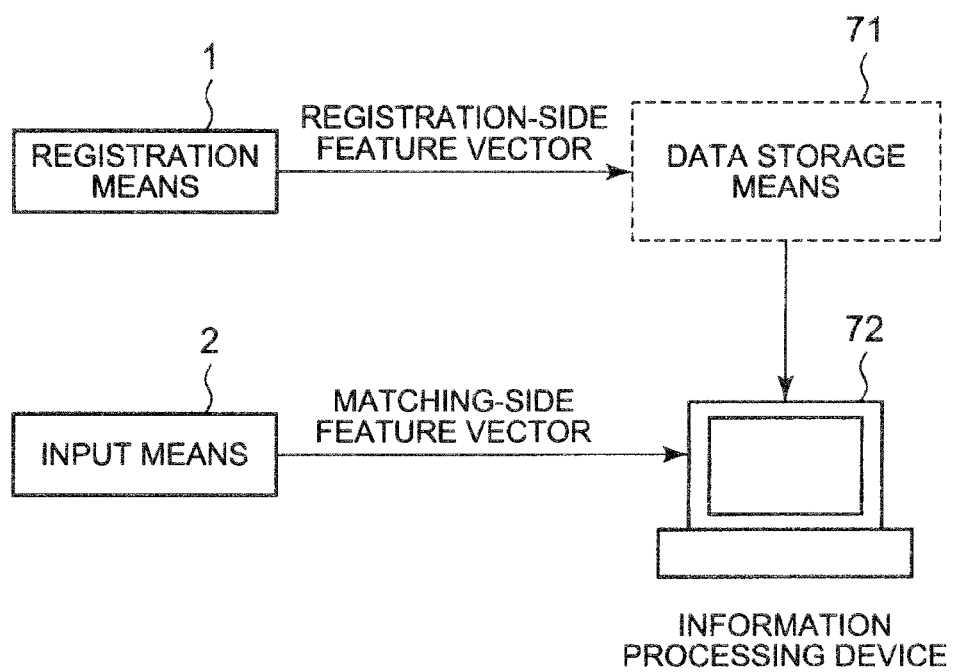
FIG. 1 It depicts an explanatory drawing showing the outline of a matching device in accordance with a first exemplary embodiment of the present invention.

Referring now to the drawings, a description will be given in detail of exemplary embodiments in accordance with the present invention.

First Exemplary Embodiment

FIG. 1 is an explanatory drawing showing the outline of a matching device in accordance with a first exemplary embodiment of the present invention. The matching device of the first exemplary embodiment comprises registration means 1, input means 2, data storage means 71 and an information processing device 72. In this exemplary embodiment, feature vectors representing features of data are previously stored and the degree of similarity between a newly inputted feature vector and each prestored feature vector is calculated. The prestored feature vector will hereinafter be referred to as a "registration-side feature vector", and the newly inputted feature vector will hereinafter be referred to as a "matching-side feature vector".

The data storage means 71 is a storage device for storing the registration-side feature vectors. When a feature vector is inputted, the registration means 1 stores the feature vector in the data storage means 71. This feature vector serves as a registration-side feature vector. The number of registration-side feature vectors previously registered may either be one, or more than one.

The input means 2 is an interface for inputting the matching-side feature vector to the information processing device 72.

When a matching-side feature vector is inputted, the information processing device 72 calculates the degree of similarly between the matching-side feature vector and each registration-side feature vector stored in the data storage means 71. Incidentally, the registration means 1, the input means 2 and the data storage means 71 may also be installed in the information processing device 72.

Figure 2:
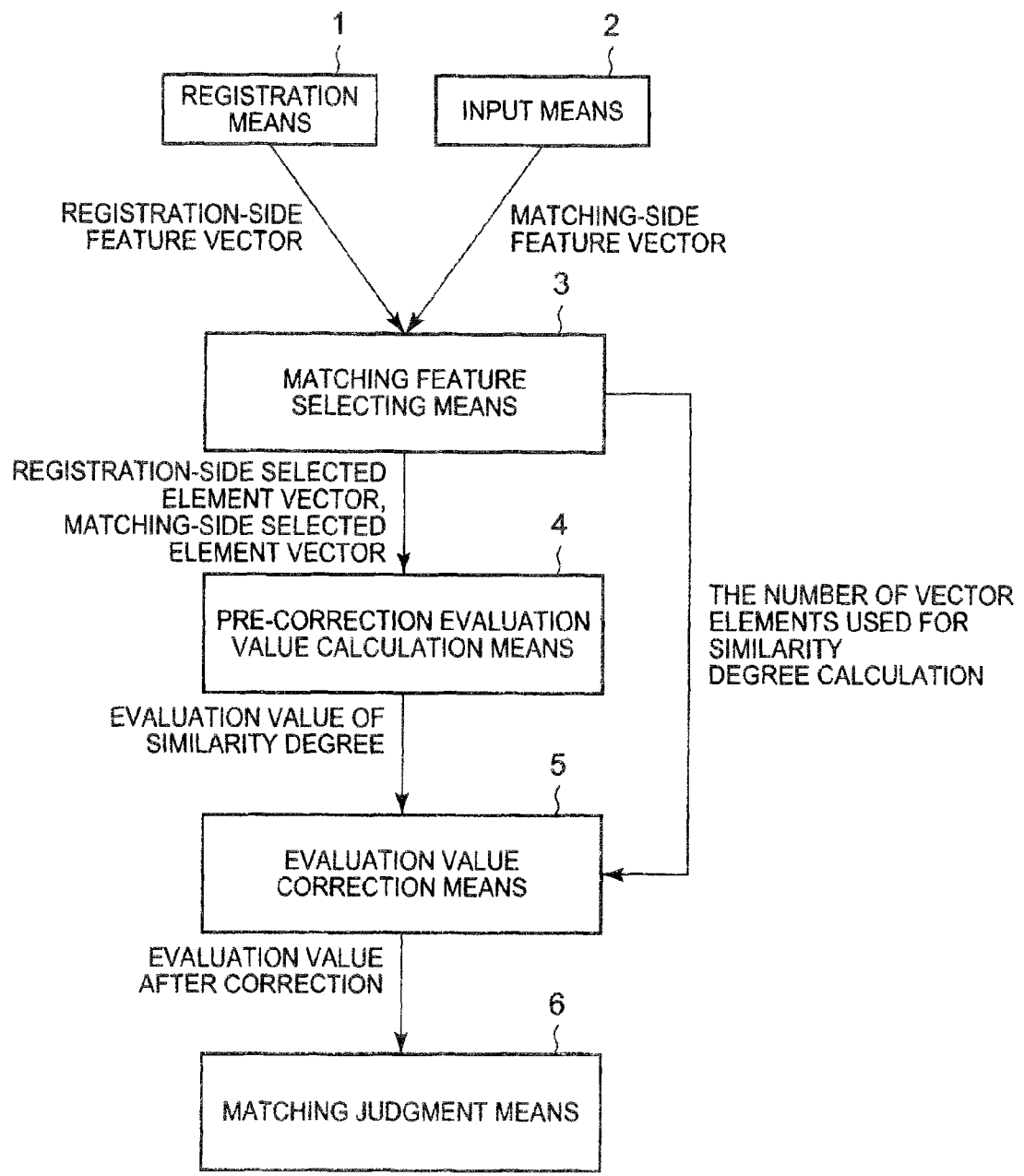
FIG. 2 It depicts is a block diagram showing an example of the configuration of the matching device in accordance with the first exemplary embodiment of the present invention.

FIG. 2 is a block diagram showing an example of the configuration of the matching device in accordance with the first exemplary embodiment of the present invention. The matching device comprises the registration means 1, the input means 2, matching feature selecting means 3, pre-correction evaluation value calculation means 4, evaluation value correction means 5 and matching judgment means 6. The matching device also comprises the data storage means 71 (see FIG. 1) while it is not shown in FIG. 2.

When a feature vector (registration-side feature vector) is inputted, the registration means 1 stores the feature vector in the data storage means 71 (see FIG. 1, not shown in FIG. 2) as mentioned above. The registration-side feature vector is loaded by the matching feature selecting means 3.

When a matching-side feature vector is inputted, the input means 2 outputs the matching-side feature vector to the matching feature selecting means 3.

Here, the registration-side feature vector and the matching-side feature vector will be explained. Each feature vector is a vector representing features of data of an object (including a person etc.). If a registration-side feature vector has been stored in the data storage means 71 (see FIG. 1, not shown in FIG. 2), it means that an object corresponding to the feature vector has been registered. The type of the data represented by the feature vector is not particularly limited in this exemplary embodiment. For example, the data can be an image representing the face of a person or the like, sound data representing sound, etc. The data can also be an electric signal of an object, etc. Where each of registration-side feature vector and matching-side feature vector is a feature vector of an image, a vector having pixel values of pixels as its elements may be used as the feature vector, for example. Where each of registration-side feature vector and matching-side feature vector is sound data, a vector having sound level values at specified frequencies as its elements may be used as the feature vector, for example.

The registration-side feature vectors and the matching-side feature vector are assumed to be in the same number of dimensions. However, each vector can lack part of the elements. In the case where each feature vector has pixel values of pixels of an image as its elements, for example, an error value representing error may exist in the elements even though the number of pixels of each image is constant both in the registration side and in the matching side. For example, when part of the pixel values are lost or are representing abnormal values due to the hiding, etc., elements corresponding to such pixels may be set at the error value. While an image is taken as an example here, the same goes for cases where each feature vector is determined from sound data, etc.

When a matching-side feature vector is inputted from the input means 2, the matching feature selecting means 3 executes the following process for each vector pair made up of the matching-side feature vector and each registration-side feature vector. The matching feature selecting means 3 selects feature vector elements to be used for the calculation of the degree of similarly from the matching-side feature vector and the registration-side feature vector while counting the number of elements selected from one feature vector as the number of feature vector elements used for the similarity degree calculation. The positions of elements having non-error values due to data loss etc. do not coincide with each other between the registration-side feature vector and the matching-side feature vector. The matching feature selecting means 3 may select elements at positions where elements having non-error values correspond to each other between the registration-side feature vector and the matching-side feature vector as the feature vector elements to be used for the similarity degree calculation. An example will be shown below. For the simplicity of explanation, the registration-side feature vector (Va) and the matching-side feature vector (Vb) are assumed to be five-dimensional vectors. The registration-side feature vector Va and the matching-side feature vector Vb are assumed to be the following vectors:

$$Va=(Va1, Va2, X, X, Va5)$$

$$Vb=(Vb1, X, Vb3, X, Vb5)$$

"X" in each feature vector represents the error value. In this case, elements having non-error values in both feature vectors Va and Vb are the first and fifth elements. Therefore, the matching feature selecting means 3 selects the first and fifth elements from the registration-side feature vector Va while similarly selecting the first and fifth elements from the matching-side feature vector Vb. In this case, the number of feature vector elements used for the similarity degree calculation is two since the number of elements selected from each feature vector is two. While each feature vector in this example has been assumed to be in five dimensions for the simplicity of explanation, the number of dimensions of actual feature vectors may be different from five.

It can be said that the matching feature selecting means 3 selects elements with which pairs of elements corresponding to each other are formed.

The matching feature selecting means 3 outputs vectors, which are selected from the matching-side feature vector and the registration-side feature vector, made up of elements to be used for the similarity degree calculation to the pre-correction evaluation value calculation means 4 while outputting the number of elements used for the similarity degree calculation to the evaluation value correction means 5. The vector made up of the elements selected from the registration-side feature vector will hereinafter be referred to as a "registration-side selected element vector". Similarly, the vector made up of the elements selected from the matching-side feature vector will hereinafter be referred to as a "matching-side selected element vector". Thus, the matching feature selecting means 3 outputs the registration-side selected element vector and the matching-side selected element vector to the pre-correction evaluation value calculation means 4 while outputting the number of elements of each vector to the evaluation value correction means 5.

The pre-correction evaluation value calculation means 4 calculates an evaluation value of the similarity degree between the matching-side feature vector and the registration-side feature vector using the elements of the matching-side feature vector and the registration-side feature vector selected by the matching feature selecting means 3. The evaluation value calculated by the pre-correction evaluation value calculation means 4 is a value before correction. This evaluation value is corrected by the evaluation value correction means 5 which will be explained later. The pre-correction evaluation value calculation means 4 may calculate the evaluation value of the similarity degree as explained below. For example, the pre-correction evaluation value calculation means 4 may calculate the sum of squares of differences between corresponding elements of the registration-side selected element vector and the matching-side selected element vector as the evaluation value of the similarity degree. Specifically, let "qi" stand for the i-th element of the registration-side feature vector and "ci" stand for the i-th element of the matching-side feature vector, the pre-correction evaluation value calculation means 4 may calculate the evaluation value (=D) according to the following expression (1):

expression (1)
$$D = \sum_i |qi - ci|^2 \qquad (1)$$

The evaluation value correction means 5 corrects the evaluation value D of the similarity degree which is calculated by the pre-correction evaluation value calculation means 4, according to the number of feature vector elements used for the similarity degree calculation. The number of feature vector elements used for the similarity degree calculation is the value inputted from the matching feature selecting means 3. In this case, the evaluation value correction means 5 corrects the evaluation value so that the increment of the evaluation value increases with the increase in the number of feature vector elements used for the similarity degree calculation. For example, the evaluation value correction means 5 calculates the corrected evaluation value (=Dc) according to the following expression (2):

$$Dc = D + f(A) \qquad (2)$$

In the expression (2), "A" represents the number of feature vector elements used for the similarity degree calculation. The function "f(A)" is a corrective function which increases with the increase in the value of A. While various techniques can be used for determining the corrective function f, an example of determining the value of "w" in the function f(A) in the following expression (3) will be explained below.

$$f(A) = w \times A \qquad (3)$$

The function f(A) in the expression (3) can be regarded as a function for performing linear correction using the parameter "w" as the corrective weight. The parameter "w" may be determined previously as explained below. In the following explanation, a case where each feature vector represents a face image of a person will be described as an example.

For example, multiple pairs of feature vectors of different people and multiple pairs of feature vectors of the same person (hereinafter referred to also as "same-person feature vector pairs") are previously prepared. For each pair, the feature vector elements to be used for the similarity degree calculation are selected while counting the number A of feature vector elements used for the similarity degree calculation in the same way as the matching feature selecting means 3, and the evaluation value D of the similarity degree is determined previously by executing calculation in the same way as the pre-correction evaluation value calculation means 4. FIG. 3 is an explanatory drawing showing an example of the evaluation values D and the numbers A determined as above. In the example of FIG. 3, each of the values/numbers D1, A1, D2, A2, D3, A3, etc. is calculated using a pair of feature vectors of different people and each of the values/numbers D4, A4, D5, A5, D6, A6, etc. is calculated using a pair of feature vectors of the same person. It should be noted that feature vectors of the same person are not necessarily identical with each other.

For each combination of D and A determined as above, the values of Dc in the expression (2) are calculated by successively changing the value of w in the expression (3) at intervals of 0.1, for example. Then, a value of w that causes the most distinct difference between the values of Dc in the different-people feature vector pairs and the values of Dc in the same-person feature vector pairs is determined. For example, it is possible to determine a value of w at which a tendency like "the values of Dc in the different-people feature vector pairs are a certain value or below and the values of Dc in the same-person feature vector pairs exceed the certain value" becomes pronounced. The function f(A) can be determined previously by experimentally determining the corrective weight w as above.

Incidentally, while the value of w was changed at intervals of 0.1 in the above example, the interval is not restricted to 0.1. When it is impossible to determine an appropriate value of w even by changing the value of w within a certain range, the range and/or the interval of changing w may be modified successively.

Further, the evaluation value correction means 5 may make the correction by executing a calculation different from the expression (2). For example, the evaluation value correction means 5 may apply the two-class problem regarding a particular person and another person to the evaluation value D and the number A of feature vector elements used for the similarity degree calculation and make a correction like the following expression (4) by employing techniques like the linear discriminant analysis, the principal component analysis and the linear SVM (Support Vector Machine). In the following expression (4), "Wd" represents a corrective weight for the evaluation value D and "Wa" represents a corrective weight for the number A of feature vector elements used for the similarity degree calculation.

$$Dc = Wd \times D + Wa \times A \qquad (4)$$

Figure 4:
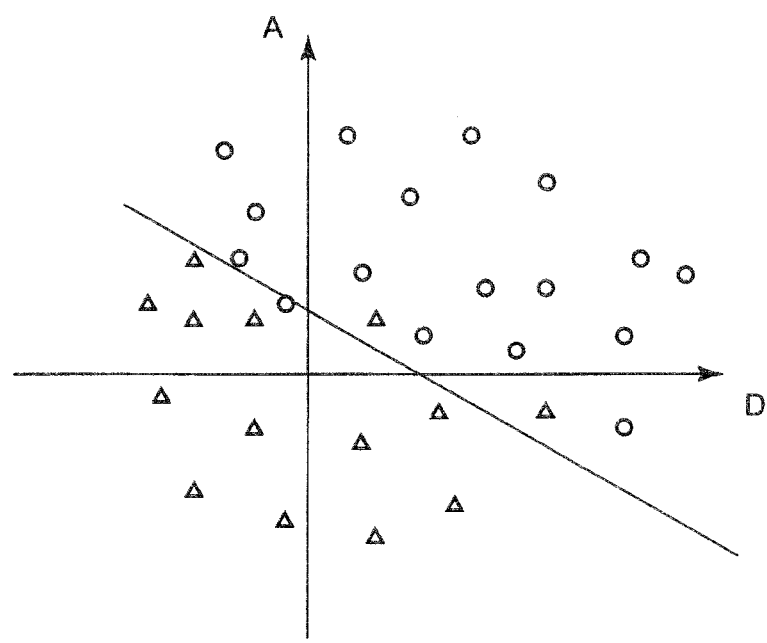
FIG. 4 It depicts an explanatory drawing in which coordinates (D, A) calculated for each pair are plotted on a two-dimensional plane.

When the correction is made according to the expression (4), the corrective weights Wd and Wa may be determined previously as explained below. Multiple different-people feature vector pairs and multiple same-person feature vector pairs are previously prepared and the evaluation value D and the number A are calculated for each pair similarly to the case of FIG. 3. The values/numbers D and A obtained above can be plotted on a two-dimensional plane as illustrated in FIG. 4. In FIG. 4, positions of (D, A) in the two-dimensional plane are indicated by using the values/numbers D and A (obtained as shown in FIG. 3) as coordinate values on the D-axis and the A-axis, respectively. The coordinates (D, A) acquired from the different-people feature vector pairs and the coordinates (D, A) acquired from the same-person feature vector pairs are plotted using different symbols in FIG. 4. As shown in FIG. 4, the distribution area of the coordinate points (D, A) acquired from the different-people feature vector pairs differs from that of the coordinate points (D, A) acquired from the same-person feature vector pairs and the two areas can be separated from each other. The straight line separating the two-dimensional plane (defined by the D-axis and the A-axis) into the two areas corresponds to the corrective weights Wd and Wa. Thus, in the two-dimensional plane illustrated in FIG. 4, it is possible to determine a straight line that classifies the distribution of the experimentally calculated coordinates (D, A) into two groups and determine Wd and Wa that represent the straight line.

The evaluation value correction means 5 may also calculate the corrected evaluation value Dc as a value of a function including D and A as variables, as shown in the following expression (5):

$$Dc = f(D, A) \qquad (5)$$

Figure 5:
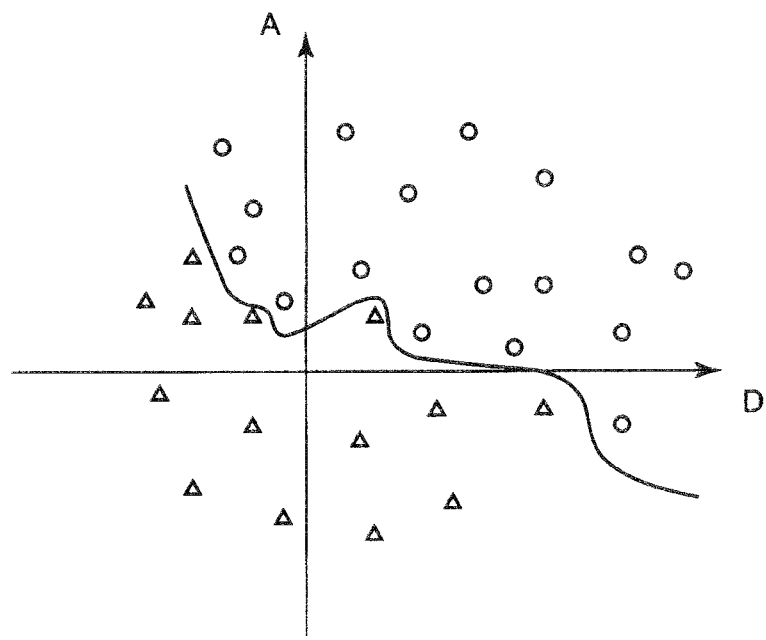
FIG. 5 It depicts an explanatory drawing in which coordinates (D, A) calculated for each pair are plotted on a two-dimensional plane.

The coordinate distribution can also be separated by a curved line as illustrated in FIG. 5 and a function (D, A) corresponding to such a curved line may be determined. The function (D, A) for performing nonlinear correction may be determined by techniques like nonlinear SVM and neural network.

The value of Dc calculated by the evaluation value correction means 5 is the final evaluation value of the similarity degree.

The matching judgment means 6 executes the matching between the object represented by the matching-side feature vector and the object represented by the registration-side feature vector by comparing the calculated evaluation value Dc after the correction with a threshold value. For example, the matching judgment means 6 may judge that the objects represented by the two vectors are different from each other if the similarity degree between the matching-side feature vector and the registration-side feature vector (i.e., Dc calculated by the evaluation value correction means 5) is less than a preset threshold value while judging that the objects are identical with (or similar to) each other if the similarity degree is the threshold value or higher. In other words, let "Dt" stand for the threshold value, the matching judgment means 6 may judge that the objects are different from each other if $Dc < Dt$ while judging that the objects are identical with (or approximate to) each other if $Dt \leq Dc$.

When there are two or more registration-side feature vectors, the matching feature selecting means 3, the pre-correction evaluation value calculation means 4 and the evaluation value correction means 5 may execute their processes for each registration-side feature vector and the matching judgment means 6 may search for registration-side feature vectors whose similarity degrees Dc with respect to the matching-side feature vector are a preset threshold value or higher. The matching judgment means 6 may also search for a registration-side feature vector whose similarity degree Dc is the maximum, that is, a registration-side feature vector that is the most approximate to the matching-side feature vector.

The registration means 1, the matching feature selecting means 3, the pre-correction evaluation value calculation means 4, the evaluation value correction means 5 and the matching judgment means 6 are implemented by, for example, a CPU of a computer operating according to a matching program. The matching program is stored in, for example, a program storage unit (not shown in figures) of the computer. The CPU may load the program and operate as the registration means 1, the matching feature selecting means 3, the pre-correction evaluation value calculation means 4, the evaluation value correction means 5 and the matching judgment means 6 according to the loaded program. It is also possible to implement the registration means 1, the input means 2, the matching feature selecting means 3, the pre-correction evaluation value calculation means 4, the evaluation value correction means 5 and the matching judgment means 6 by separate hardware modules.

Next, the operation will be described.

Figure 6:
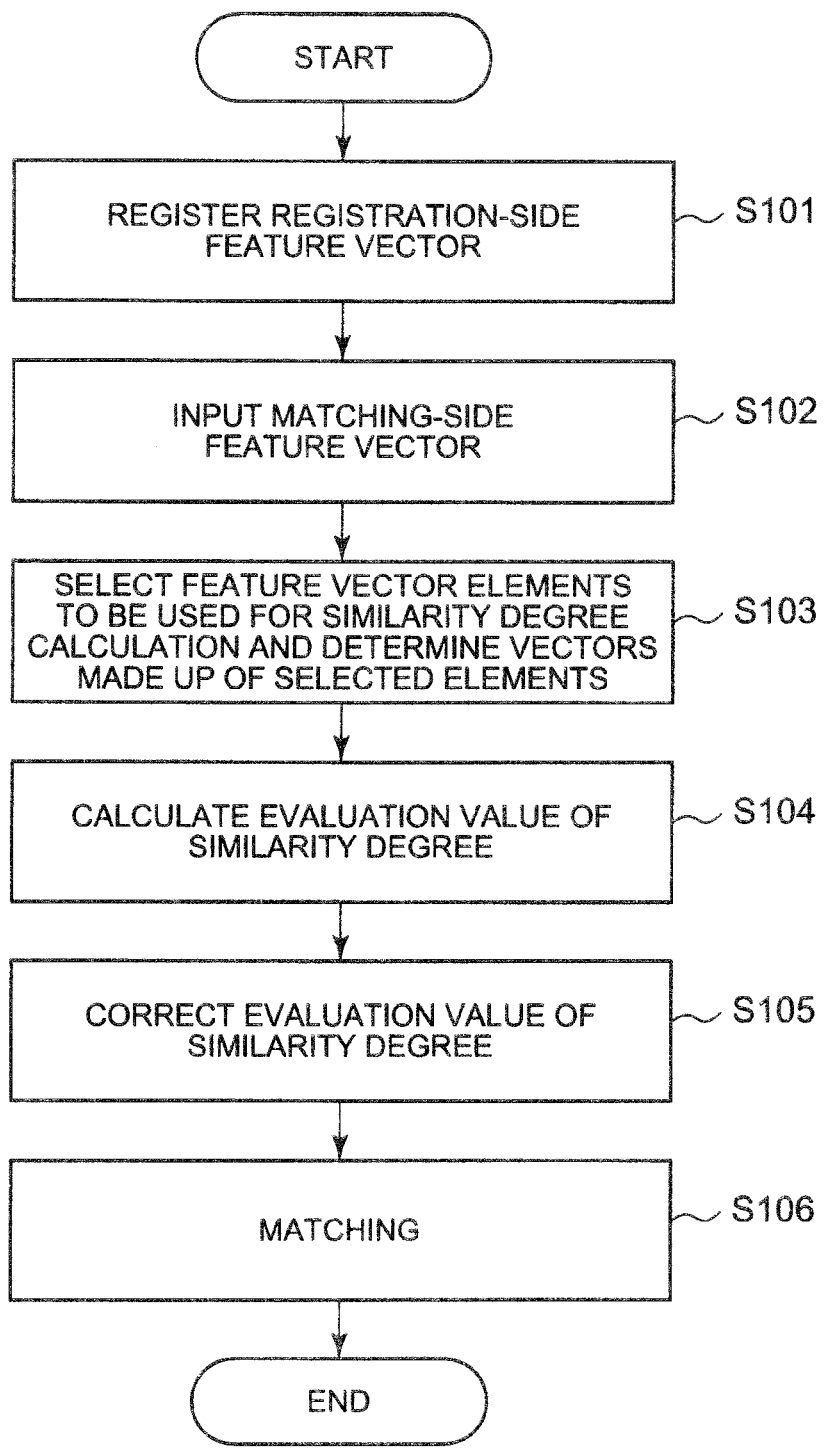
FIG. 6 It depicts a flow chart showing an example of a process flow in the first exemplary embodiment of the present invention.

FIG. 6 is a flow chart showing an example of a process flow in the first exemplary embodiment of the present invention. When a registration-side feature vector representing features of an object as a target of the registration is inputted, the registration means 1 stores the registration-side feature vector in the data storage means 71 (see FIG. 1, not shown in FIG. 2) (step S101).

Thereafter, when a matching-side feature vector representing features of an object as a target of the matching is inputted to the input means 2 (step S102), the matching feature selecting means 3 selects feature vector elements to be used for the similarity degree calculation from the matching-side feature vector and the registration-side feature vector. In this case, the matching feature selecting means 3 may select elements existing at positions where elements having non-error values correspond to each other between the registration-side feature vector and the matching-side feature vector. The matching feature selecting means 3 determines the registration-side selected element vector (made up of the elements selected from the registration-side feature vector) and the matching-side selected element vector (made up of the elements selected from the matching-side feature vector) and outputs the registration-side selected element vector and the matching-side selected element vector to the pre-correction evaluation value calculation means 4 (step S103). In the step S103, the matching feature selecting means 3 also counts the number of elements selected from one feature vector as the number of feature vector elements used for the similarity degree calculation.

Subsequently, the pre-correction evaluation value calculation means 4 calculates the evaluation value D of the similarity degree between the matching-side feature vector and the registration-side feature vector using the matching-side selected element vector which are made up of the elements selected from the matching-side feature vector in the step S103, and the registration-side selected element vector which are made up of the elements selected from the registration-side feature vector in the step S103 (step S104). In the step S104, the evaluation value D may be calculated according to the expression (1), for example.

Subsequently, the evaluation value correction means corrects the evaluation value D so that the increment of the evaluation value increases with the increase in the number of feature vector elements used for the similarity degree calculation (step S105). The correction of the evaluation value D may be made by, for example, executing calculation according to the expressions (2), (4), (5), etc. The function f(A) in the expression (2), the corrective weights Wd and Wa in the expression (4) and the function f(D, A) in the expression (5) may be determined previously.

Subsequently, the matching judgment means 6 executes the matching between the object represented by the matching-side feature vector and the object represented by the registration-side feature vector based on the corrected evaluation value obtained in the step S105 (step S106). For example, the matching judgment means 6 may judge that the two objects are identical with (or approximate to) each other if the evaluation value of the similarity degree is a threshold value or higher while judging that the two objects are different from each other if the evaluation value is less than the threshold value.

When there are two or more registration-side feature vectors, the steps S103-S105 may be executed for each registration-side feature vector. In the step S106, the matching judgment means 6 may select registration-side feature vectors whose similarity degree evaluation values with respect to the matching-side feature vector are a threshold value or higher. In other words, the matching judgment means 6 may determine objects identical with (or objects judged to be approximate to) the object represented by the matching-side feature vector. The matching judgment means 6 may also select a registration-side feature vector whose similarity degree evaluation value is the maximum. In other words, the matching judgment means 6 may determine an object that is judged to be the most approximate to the object represented by the matching-side feature vector.

In this exemplary embodiment, the evaluation value is corrected so that the increment of the evaluation value increases with the increase in the number of feature vector elements used for the similarity degree calculation. Therefore, a highly accurate similarity degree can be calculated avoiding the effect of the number of feature vector elements used for the similarity degree calculation. Specifically, while the similarity degree generally tends to be calculated higher when the number of vector elements used for the similarity degree calculation is small, degrees of similarly not having such a tendency can be determined by the present invention.

Second Exemplary Embodiment

In a second exemplary embodiment, the similarity degree is calculated by use of feature vectors each having pixel values of an image as its elements. Thus, a vector having pixel values of a previously registered image as its elements will hereinafter be referred to as a "registration-side feature vector", and a vector having pixel values of an image inputted for the matching (hereinafter called a "matching image") as its elements will hereinafter be referred to as a "matching-side feature vector".

Figure 7:
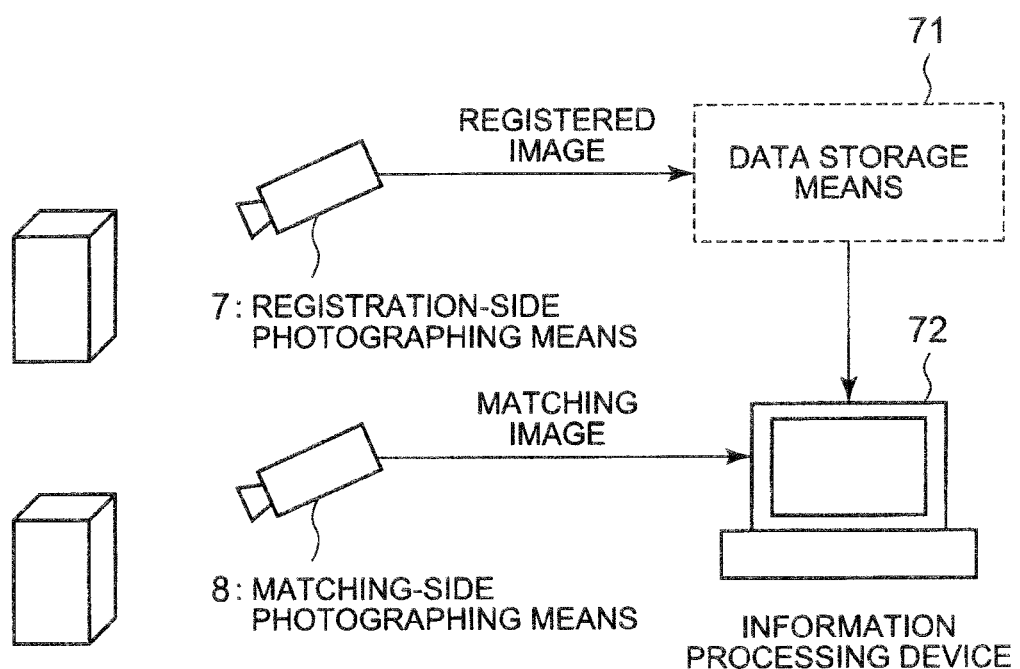
FIG. 7 It depicts is an explanatory drawing showing the outline of a matching device in accordance with a second exemplary embodiment of the present invention.

FIG. 7 is an explanatory drawing showing the outline of a matching device in accordance with the second exemplary embodiment of the present invention. The matching device of the second exemplary embodiment comprises registration-side photographing means 7, matching-side photographing means 8, data storage means 71 and information processing device 72.

In this exemplary embodiment, the data storage means 71 stores the registered image. The registration-side photographing means 7 photographs an object to be previously stored as the registered image and stores an image generated by the photographing in the data storage means 71. This image corresponds to the registered image.

Meanwhile, the matching-side photographing means 8 photographs an object to be matched with the object represented by the registered image and inputs an image generated by the photographing to the information processing device 72. This image corresponds to the matching image.

When the matching image is inputted, the information processing device 72 calculates the similarity degree between the matching-side feature vector having the pixel values of the matching image as its elements and the registration-side feature vector having the pixel values of the registered image as its elements.

The registration-side photographing means 7 and the matching-side photographing means 8 are implemented by cameras, for example. The registration-side photographing means 7 and the matching-side photographing means 8 may also be implemented by the same camera. The registration-side photographing means 7, the matching-side photographing means 8 and the data storage means 71 may also be installed in the information processing device 72.

Figure 8:
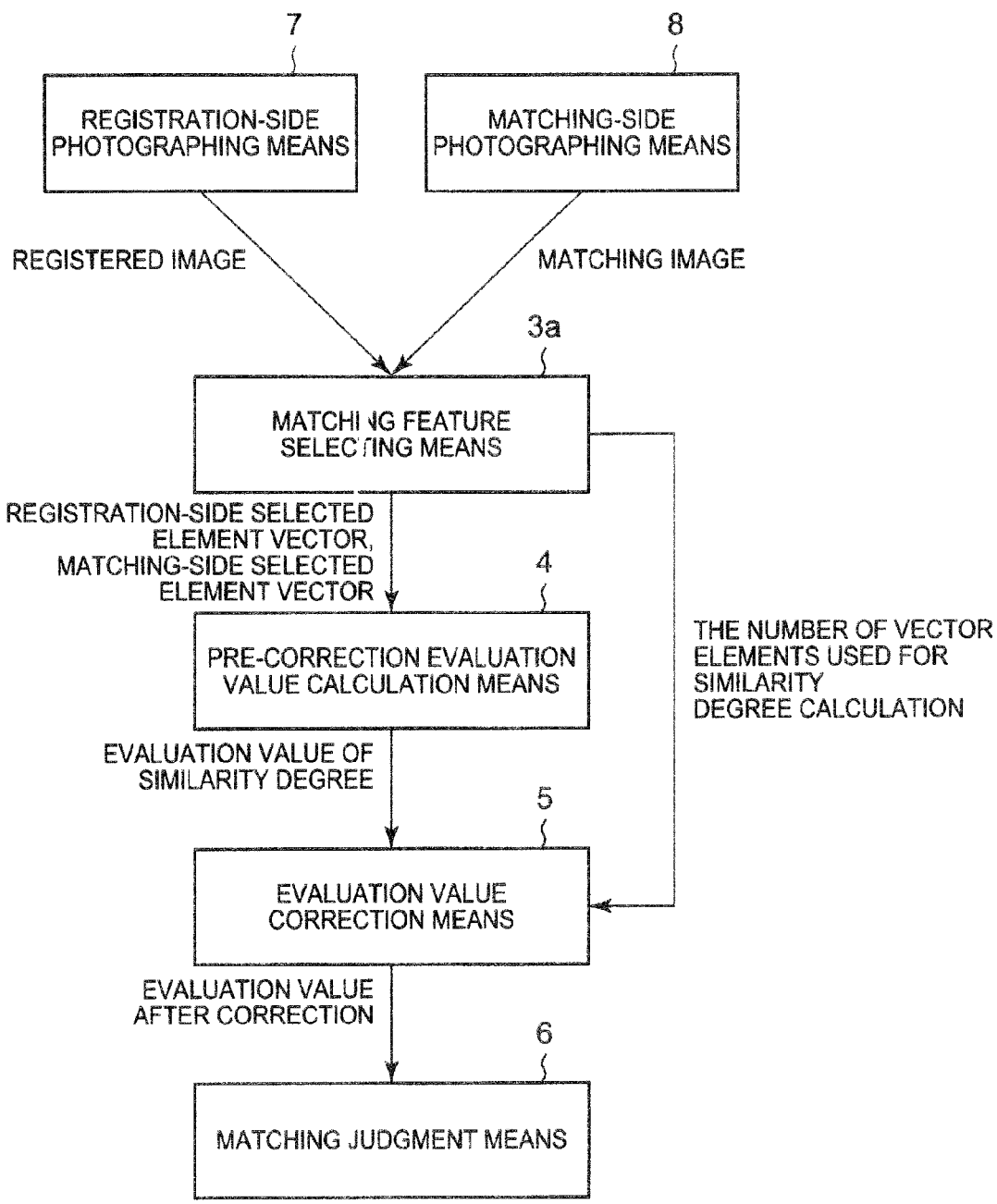
FIG. 8 It depicts is a block diagram showing an example of the configuration of the matching device of the second exemplary embodiment.

FIG. 8 is a block diagram showing an example of the configuration of the matching device of the second exemplary embodiment. The matching device of the second exemplary embodiment comprises the registration-side photographing means 7, the matching-side photographing means 8, matching feature selecting means 3a, the pre-correction evaluation value calculation means 4, the evaluation value correction means 5 and the matching judgment means 6. The matching device also comprises the data storage means 71 (see FIG. 7) while it is not shown in FIG. 8. Components equivalent to those in the first exemplary embodiment are assigned the same reference characters as in FIG. 2 and detailed explanation thereof is omitted for brevity.

The registration-side photographing means 7 photographs an object to be previously stored as the registered image and stores an image generated by the photographing in the data storage means 71 as mentioned above. This registered image is loaded by the matching feature selecting means 3a. The matching-side photographing means 8 photographs an object to be matched with the object represented by the registered image and outputs an image generated by the photographing to the matching feature selecting means 3a.

While the registered/matching image is a face image of a person, for example, the registered/matching image can also be an image of an object other than a person.

Figure 9:
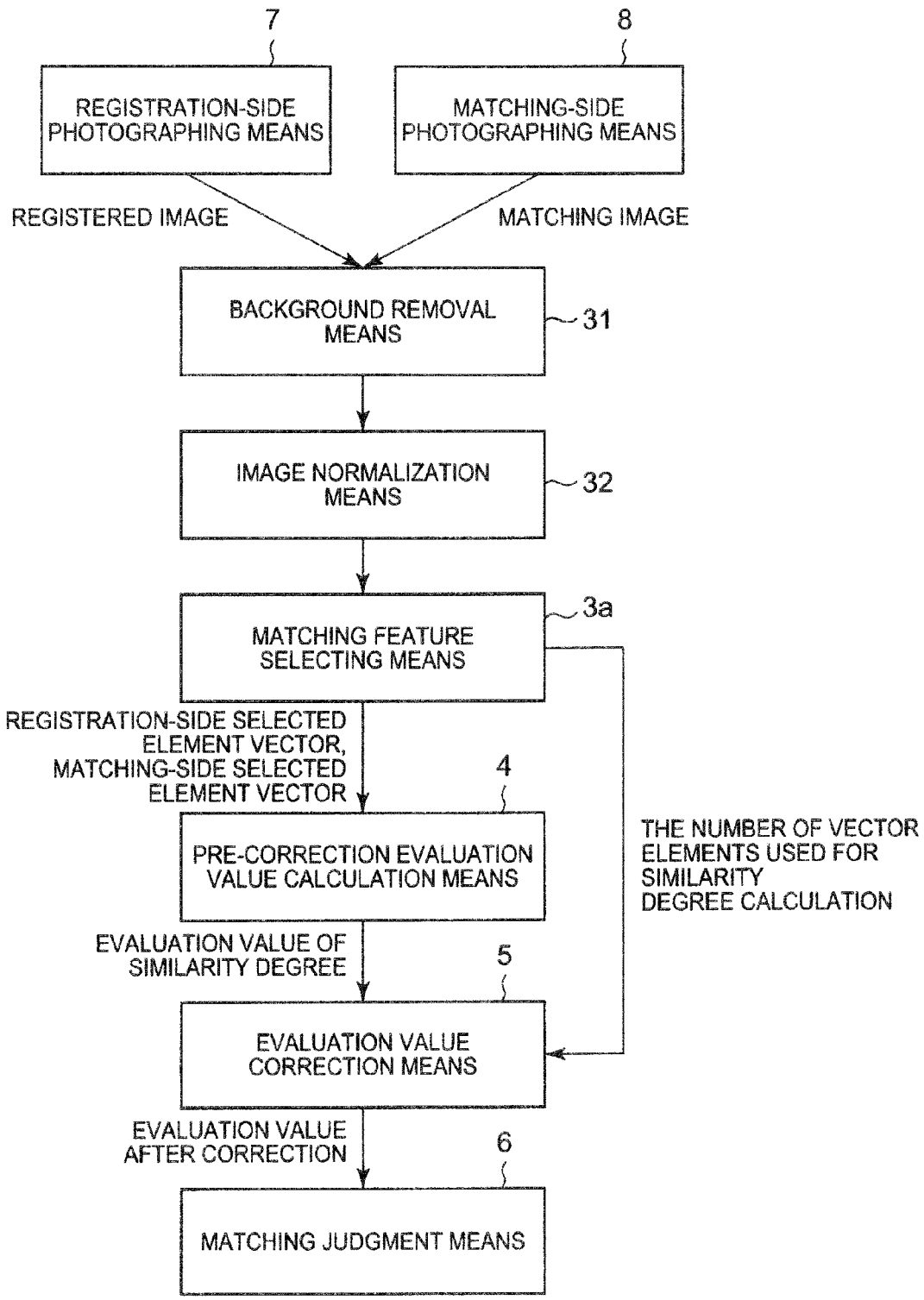
FIG. 9 It depicts is a block diagram showing an example of the configuration of a matching device equipped with background removal means 31 and image normalization means 32.

There are cases where the registration-side photographing means 7 or the matching-side photographing means 8 photographing an object also photographs a background. In such cases, each image generated by the photographing can include various background areas other than the object. As shown in FIG. 9, the matching device may be equipped with background removal means 31 for processing images so as to remove the background areas in the registered image and the matching image. FIG. 9 shows an example of the configuration of the matching device equipped with the background removal means 31 and image normalization means 32 which will be explained next. The background removal means 31 may process the image so as to fill the background areas with a color of a particular pixel value (e.g., white), for example.

It is assumed in this example that the number of pixels of the image generated by the registration-side photographing means 7 equals that of the image generated by the matching-side photographing means 8 and the distance from the registration-side photographing means 7 to an object when photographing the object is always substantially equal to the distance from the matching-side photographing means 8 to an object when photographing the object. Consequently, each image has the same number of pixels and equivalent things appear at corresponding positions in the images. When faces are photographed, for example, eyes, etc. are situated at substantially corresponding positions in the images.

Figure 10:
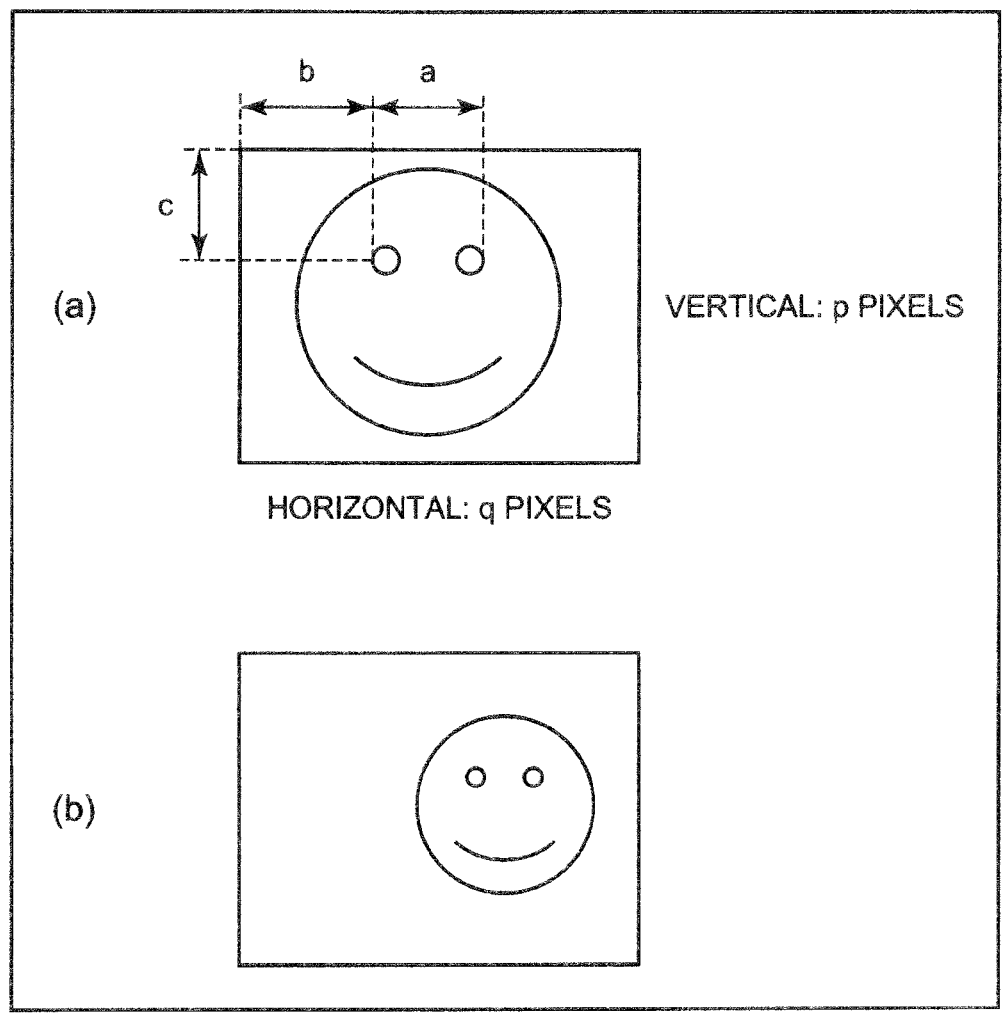
FIG. 10 It depicts is an explanatory drawing showing an example of normalization of an image.

There can be cases where the distance to the object when photographing the object is not constant and the position of the object in each image varies. When such a situation can occur, the matching device may be equipped with the aforementioned image normalization means 32 as shown in FIG. 9. The image normalization means 32 transforms each image so that equivalent things appear at corresponding positions in the images. The image normalization means 32 may transform (normalize) each image so that the object appears in the image (having the preset number of pixels) with a characteristic part of the object satisfying a prescribed condition. Assuming that each of the registered/matching images is a face image of a person, for example, the image normalization means 32 may determine characteristic pixels representing characteristic parts such as the tails of the eyes and transform each of the registered/matching images to an image in which the number of pixels between the pixels representing the tails of the right and left eyes equals a prescribed number and the pixel representing the tail of the right eye exists at a position that is prescribed numbers of pixels rightward and downward from the pixel at the upper left corner (reference position) of the image. Specifically, as illustrated in FIG. 10(a), the image normalization means 32 may transform each of the registered/matching images to an image having a prescribed number (p×q) of pixels in which the positions of the tails of the eyes are specified by prescribed numbers (a, b, c) of pixels (see FIG. 10(a)). Even when the face is small in the image or not placed at the center of the image as shown in FIG. 10(b), for example, the image normalization means 32 may normalize the image, that is, transform each image so that the object is placed at the same position. For the normalization, the image normalization means 32 may prestore pattern information representing pixel patterns of characteristic parts (e.g., tails of the eyes) and detect positions that match the pattern information from each image.

The second and subsequent exemplary embodiments will be explained assuming that the registration-side photographing means 7 and the matching-side photographing means 8 photograph each object at a fixed distance and generate images in the normalized state for the sake of simplicity of explanation. However, the matching device may be equipped with the background removal means 31 and the image normalization means 32 even in embodiments from a third exemplary embodiment which will be described later.

The matching feature selecting means 3a determines areas in each of the registered/matching images where the hiding has occurred in the object area (area representing the object). Then, the matching feature selecting means 3a selects pixel values of pixels in areas where the hiding has occurred in neither the registered image nor the matching image as vector elements, and outputs vectors made up of the selected vector elements (registration-side selected element vector, matching-side selected element vector) to the pre-correction evaluation value calculation means 4. The registration-side selected element vector and the matching-side selected element vector have the same number of elements. The matching feature selecting means 3a outputs the number of elements to the evaluation value correction means 5 as the number of elements used for the similarity degree calculation.

Figure 11:
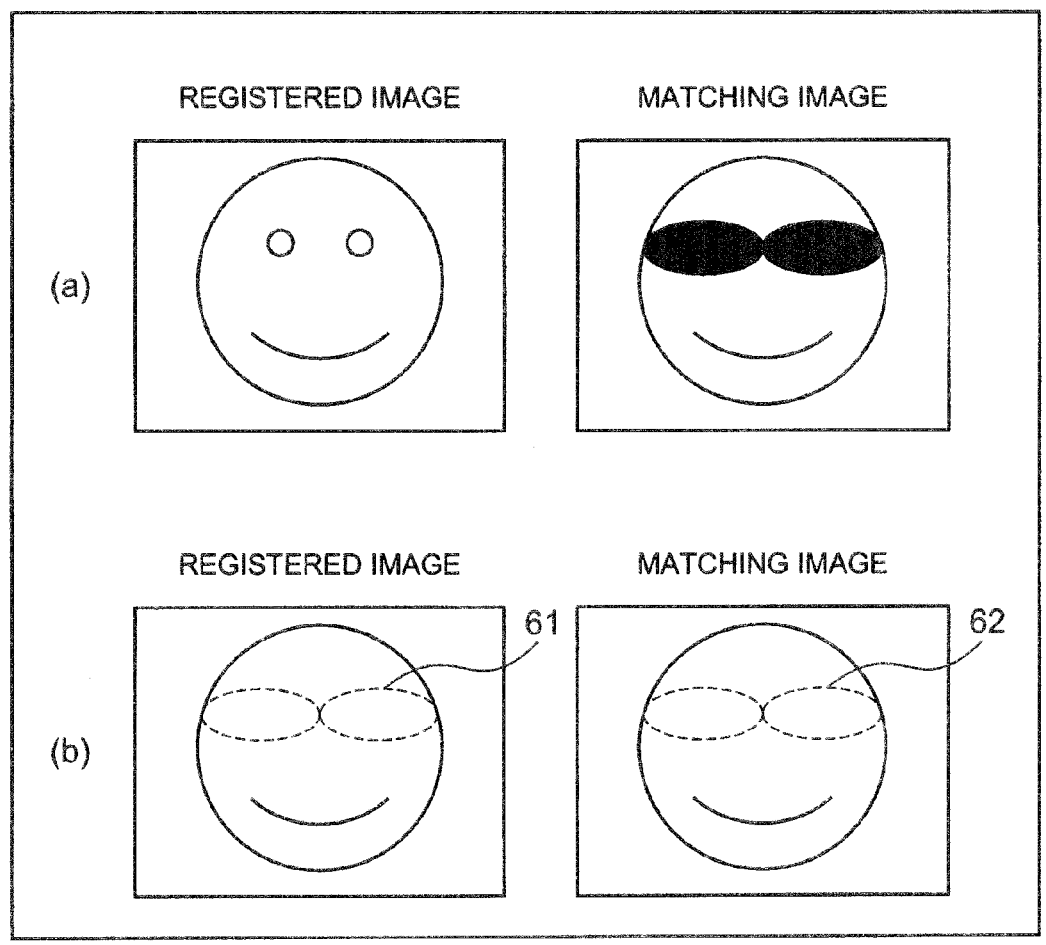

FIG. 11 is an explanatory drawing schematically showing a process executed by the matching feature selecting means 3a. Let us consider a case where the registered image and the matching image shown in FIG. 11(a) have been given, for example. In the matching image, a part of the face is hidden by sunglasses. In this case, the areas where the hiding has occurred in neither the registered image nor the matching image are the area in the registered image shown in FIG. 11(b) other than the area 61 and the area in the matching image shown in FIG. 11(b) other than the area 62. The area 61 is an area corresponding to the area 62, that is, an area that is determined by pixels in the registered image corresponding to pixels in the area 62. "Pixels in multiple images correspond to each other or one another" means that the positions of the pixels in the images are the same. The matching feature selecting means 3a outputs the registration-side selected element vector having pixel values of the pixels in the area in the registered image other than the area 61 as its elements and the matching-side selected element vector having pixel values of the pixels in the area in the matching image other than the area 62 as its elements to the pre-correction evaluation value calculation means 4. Specifically, the registration-side selected element vector and the matching-side selected element vector are determined so that pixel values of pixels corresponding to each other becomes elements corresponding to each other in the registration-side selected element vector and the matching-side selected element vector.

While a case where the hiding has occurred in the matching image is illustrated in FIG. 11, the process can be executed similarly also when the hiding has occurred in the registered image or in both images. Further, while the hiding by sunglasses is illustrated in FIG. 11, the process can be executed similarly also when the hiding has been caused by a thing other than sunglasses.

The matching feature selecting means 3a may determine the area where the hiding has occurred in each image as follows: The matching feature selecting means 3a previously stores major principal components acquired by executing the principal component analysis to images of various objects (e.g., faces of various people) that are not hidden. While the matching feature selecting means 3a in this example is assumed to prestore first through third principal components, for example, the number of the prestored principal components is not particularly limited. Each principal component is expressed as a vector having the same number of elements as the pixels of the normalized registered/matching image. An image approximate to an image of an object can be expressed by the sum of the principal components each multiplied by an appropriate coefficient. For example, let $V_1$, $V_2$ and $V_3$ stand for the first through third principal components, an image representing an object can be acquired by the calculation of $k_1V_1+k_2V_2+k_3V_3$ by properly setting the coefficients $k_1$, $k_2$ and $k_3$. The matching feature selecting means 3a prestores such principal components $V_1$, $V_2$ and $V_3$ and generates an image that is the most approximate to the image under consideration (e.g., the matching image). The matching feature selecting means 3a successively generates images by calculating $k_1V_1+k_2V_2+k_3V_3$ while changing the combination of $k_1$, $k_2$ and $k_3$ and thereby generates an image that minimizes the sum of pixel value differences with respect to the image under consideration. Then, the matching feature selecting means 3a may calculate the pixel value difference of each pixel between the generated image and the image under consideration and judge a part where the pixel value difference is great (e.g., greater than a preset threshold value) as the hidden area.

The matching feature selecting means 3a may determine the hidden area also by the technique described in the Non-patent Literature 8.

It can be said that the matching feature selecting means 3a determines the registration-side selected element vector and the matching-side selected element vector from the registration-side feature vector having the pixel values of the registered image as its elements and the matching-side feature vector having the pixel values of the matching image as its elements.

The matching feature selecting means 3a is implemented by, for example, a CPU operating according to a matching program similarly to the matching feature selecting means 3 in the first exemplary embodiment. In this case, the CPU operates as the matching feature selecting means 3a and other means according to the matching program. In cases where the matching device is equipped with the aforementioned background removal means 31 and image normalization means 32, the means 31 and 32 are also implemented by a CPU operating according to a matching program. It is also possible to implement each means by a separate hardware module.

Figure 12:
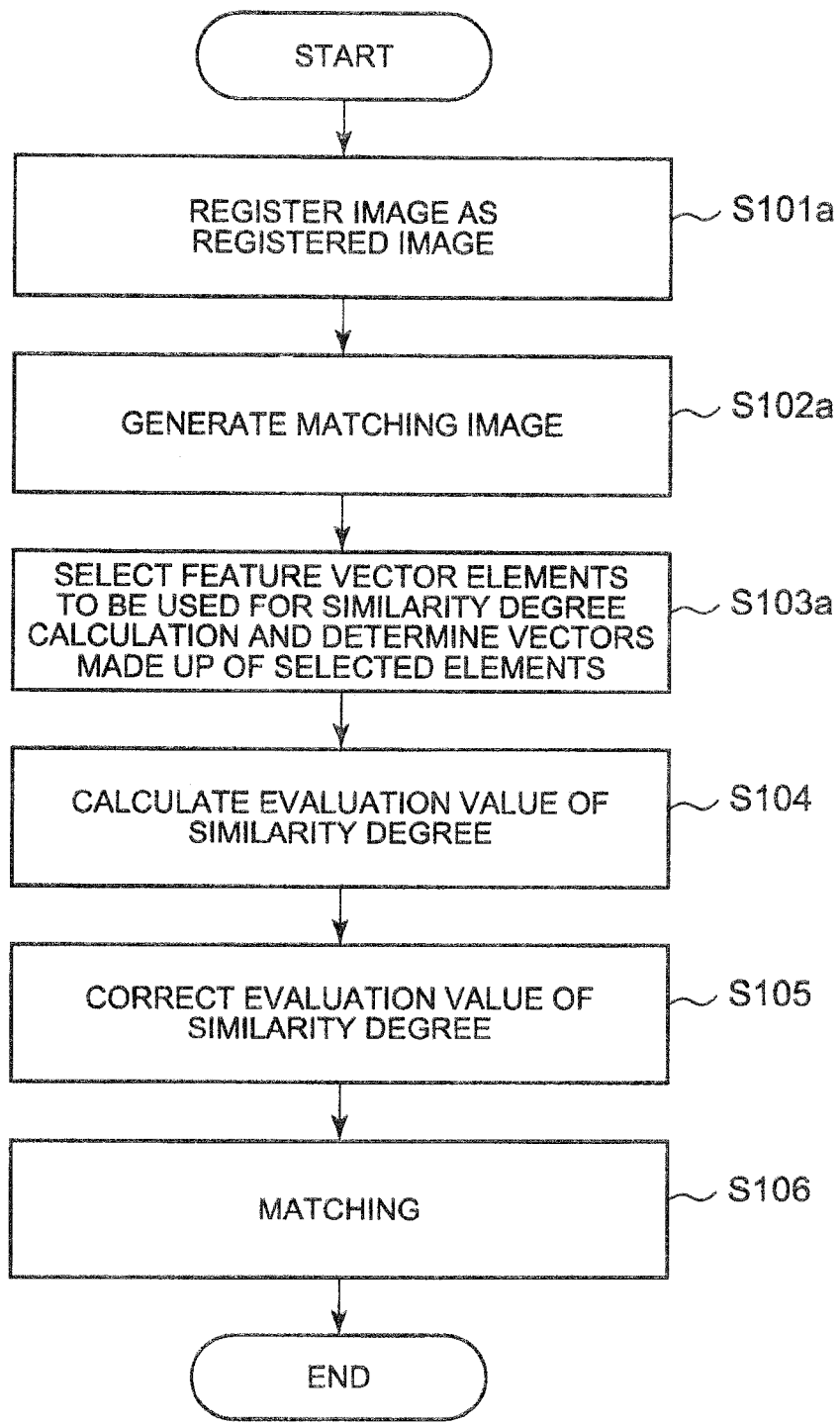
FIG. 12 It depicts is a flow chart showing an example of a process flow in the second exemplary embodiment.

Next, the operation of the second exemplary embodiment will be described. FIG. 12 is a flow chart showing an example of a process flow in the second exemplary embodiment, wherein steps equivalent to those in the first exemplary embodiment are assigned the same reference characters as in FIG. 6. The registration-side photographing means 7 photographs an object as a target of the registration and stores an image of the object (registered image) in the data storage means 71 (see FIG. 7, not shown in FIG. 8) (step S101a). Thereafter, the matching-side photographing means 8 photographs an object as a target of the matching and thereby generates an image of the object (matching image) (step S102a). The matching feature selecting means 3a determines areas in each of the registered/matching images where the hiding has occurred in the object area, and selects pixel values of pixels in areas where the hiding has occurred in neither the registered image nor the matching image as the vector elements. Then, the matching feature selecting means 3a determines the registration-side selected element vector having the pixel values selected from the registered image as its elements and the matching-side selected element vector having the pixel values selected from the matching image as its elements, and outputs the registration-side selected element vector and the matching-side selected element vector to the pre-correction evaluation value calculation means 4 (step S103a). The matching feature selecting means 3a also outputs the number of elements of the registration-side selected element vector to the evaluation value correction means 5 as the number of elements used for the similarity degree calculation.

The subsequent operation is equivalent to that in the first exemplary embodiment. Specifically, the pre-correction evaluation value calculation means 4 calculates the evaluation value D of the similarity degree between the matching image and the registered image using the registration-side selected element vector and the matching-side selected element vector (step S104). The evaluation value correction means 5 corrects the evaluation value D so that the increment of the evaluation value increases with the increase in the number of vector elements used for the similarity degree calculation (step S105). The matching judgment means 6 matches the object represented by the matching image with the object represented by the registered image based on the evaluation value after the correction (step S106). The steps S104-S106 are equivalent to those in the first exemplary embodiment.

Also in this exemplary embodiment, a highly accurate similarity degree, not having the tendency to increase when the number of vector elements used for the similarity degree calculation is small, can be calculated.

Third Exemplary Embodiment

A matching device in accordance with a third exemplary embodiment comprises the registration-side photographing means 7, the matching-side photographing means 8, the data storage means 71 and the information processing device 72 similarly to the second exemplary embodiment. However, instead of directly using the pixel values of the registered image and the matching image as the elements of the registration-side feature vector and the matching-side feature vector, feature extraction is executed to the registered image and the matching image and vectors acquired by the feature extraction are used as the registration-side feature vector and the matching-side feature vector.

Figure 13:
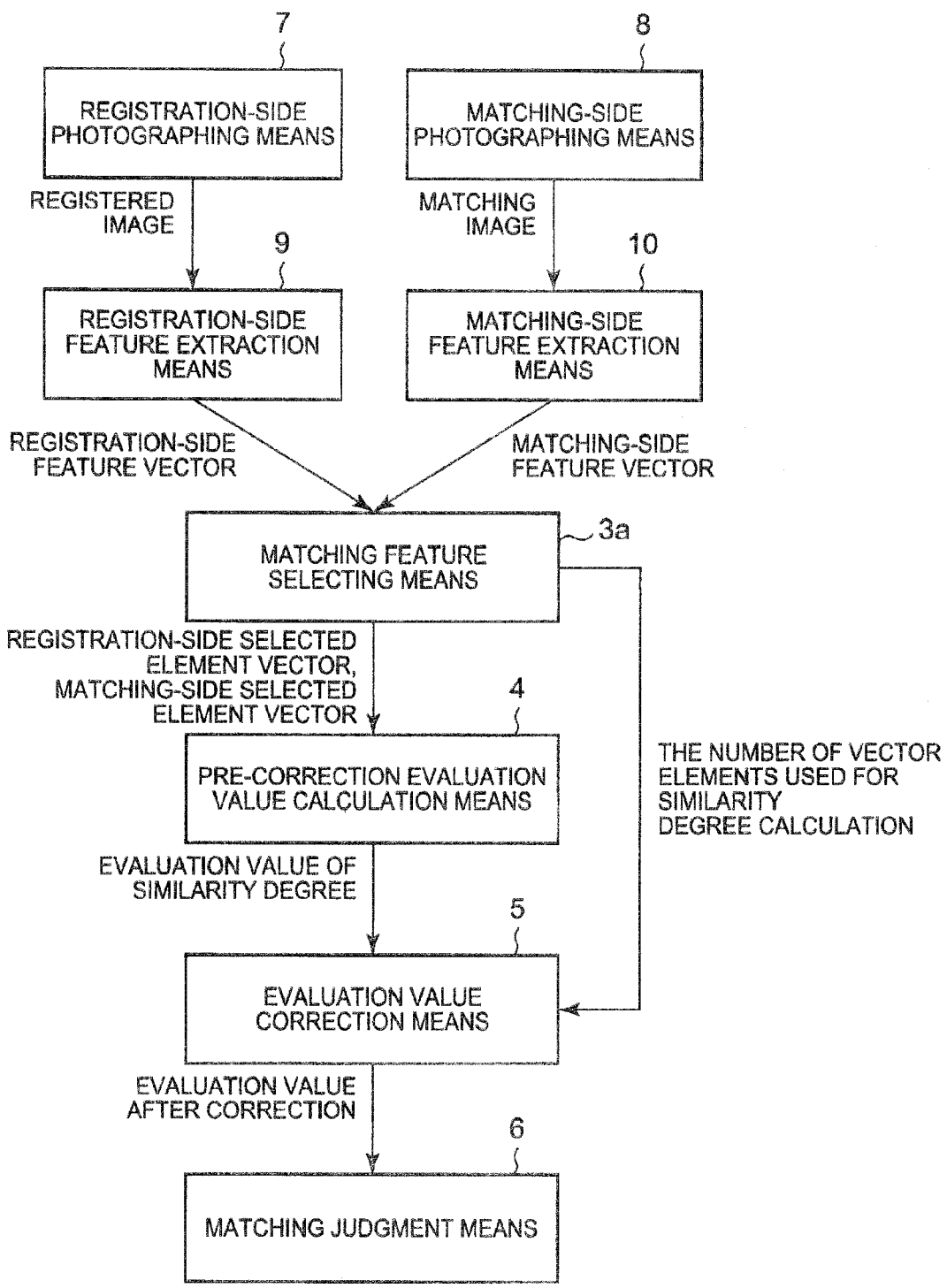
FIG. 13 It depicts is a block diagram showing an example of the configuration of a matching device in accordance with a third exemplary embodiment.

FIG. 13 is a block diagram showing an example of the configuration of the matching device of the third exemplary embodiment. Components equivalent to those in the first or second exemplary embodiment are assigned the same reference character as in FIG. 2 or 8 and detailed explanation thereof is omitted. The matching device of the third exemplary embodiment comprises the registration-side photographing means 7, the matching-side photographing means 8, registration-side feature extraction means 9, matching-side feature extraction means 10, the matching feature selecting means 3a, the pre-correction evaluation value calculation means 4, the evaluation value correction means 5 and the matching judgment means 6. The matching device also comprises the data storage means 71 (see FIG. 7) for storing the registered image while it is not shown in FIG. 13.

The registration-side feature extraction means 9 calculates the registration-side feature vector by applying a feature extraction technique to the registered image. The "feature extraction" means transforming data (e.g., image) so as to let features of the data stand out. Thus, the registration-side feature extraction means 9 executes transformation to the registered image and determines a vector having the transformed pixel values as its elements as the registration-side feature vector. For such feature extraction, a technique executing the principal component analysis to the image, like the one described in the Non-patent Literature 1, can be employed. The technique described in the Non-patent Literature 5, generating an image in which edges have been detected, may also be employed. Some examples of the feature extraction will be explained below.

Bright parts and shadowy parts appear in an image of an object depending on the position of the illuminator with respect to the object. The brightness in the bright parts and shadowy parts changes at a low frequency. The registration-side feature extraction means 9 may execute transformation, for removing the brightness variation at such a low frequency, to the registered image and determine a vector having the pixel values of the transformed image as its elements as the registration-side feature vector.

Figure 14:
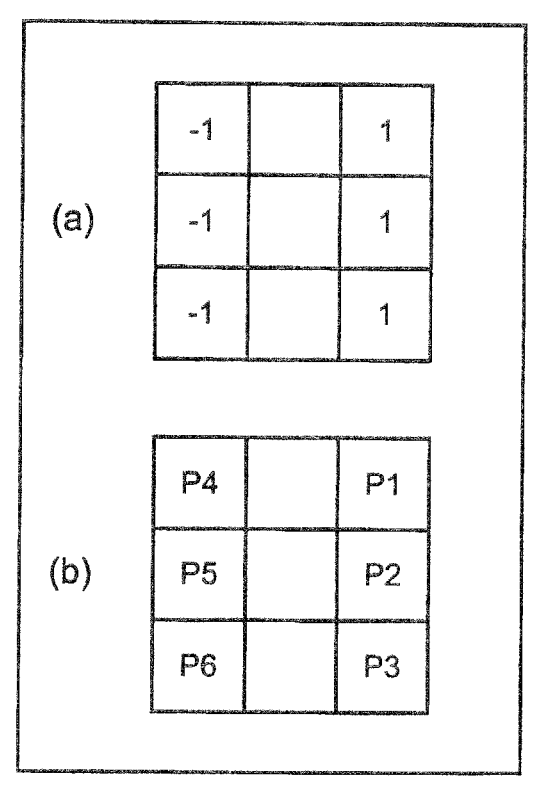

The registration-side feature extraction means 9 may also filter extracting edge of each pixel in the registered image and determine a vector having the pixel values of the filtered image as its elements as the registration-side feature vector. FIG. 14 is an explanatory drawing showing an example of filtering. FIG. 14(*a*) shows a filter for detecting the edges by eliminating color variation in the horizontal direction. The coefficients in FIG. 14(*a*) mean that the pixel value of the pixel under consideration (the pixel at the center of 3×3 pixels) is replaced with the difference between the sum of pixel values of three pixels to the right of the pixel under consideration and the sum of pixel values of three pixels to the left of the pixel under consideration. For example, when pixel values of the pixels in the vicinity of the pixel under consideration have been given as shown in FIG. 14(*b*), the pixel value of the pixel under consideration is replaced with P1+P2+P3−P4−P5−P6. The registration-side feature extraction means 9 may transform the pixel values of the registered image according to such a filter and determine a vector having the transformed pixel values as its elements as the registration-side feature vector.

The registration-side feature extraction means 9 may also enlarge or reduce the registered image and determine a vector having the pixel values of the transformed image as its elements as the registration-side feature vector.

The registration-side feature extraction means 9 outputs the calculated registration-side feature vector to the matching feature selecting means 3*a*.

The matching-side feature extraction means 10 calculates the matching-side feature vector by applying the feature extraction technique to the matching image. The method of the feature extraction is equivalent to that employed by the registration-side feature extraction means 9. Thus, the matching-side feature extraction means 10 and the registration-side feature extraction means 9 transform the matching image and the registered image by the same method and determine the feature vectors by using the transformed pixel values as the elements of the feature vectors.

The matching-side feature extraction means 10 outputs the calculated matching-side feature vector to the matching feature selecting means 3*a*.

The registration-side feature extraction means 9 and the matching-side feature extraction means 10 calculate the registration-side feature vector and the matching-side feature vector, respectively, so that the two vectors are in the same number of dimensions.

The matching feature selecting means 3*a* selects feature vector elements to be used for the similarity degree calculation by use of the registration-side feature vector determined by the registration-side feature extraction means 9 and the matching-side feature vector determined by the matching-side feature extraction means 10 and outputs vectors made up of the selected elements (registration-side selected element vector, matching-side selected element vector) to the pre-correction evaluation value calculation means 4. This operation is equivalent to that in the second exemplary embodiment. The registration-side selected element vector and the matching-side selected element vector have the same number of elements. The matching feature selecting means 3*a* outputs the number of elements to the evaluation value correction means 5 as the number of elements used for the similarity degree calculation. This operation is also equivalent to that in the second exemplary embodiment. Incidentally, the matching feature selecting means 3*a* may also operate similarly to the matching feature selecting means 3 in the first exemplary embodiment.

The operations of the pre-correction evaluation value calculation means 4, the evaluation value correction means 5 and the matching judgment means 6 are equivalent to those in the first and second exemplary embodiments.

The registration-side feature extraction means 9 and the matching-side feature extraction means 10 are implemented by, for example, a CPU operating according to a matching program. In this case, the CPU operates as the registration-side feature extraction means 9, the matching-side feature extraction means 10 and other means 3*a*, 4, 5 and 6 according to the matching program. It is also possible to implement each means by a separate hardware module.

Figure 15:
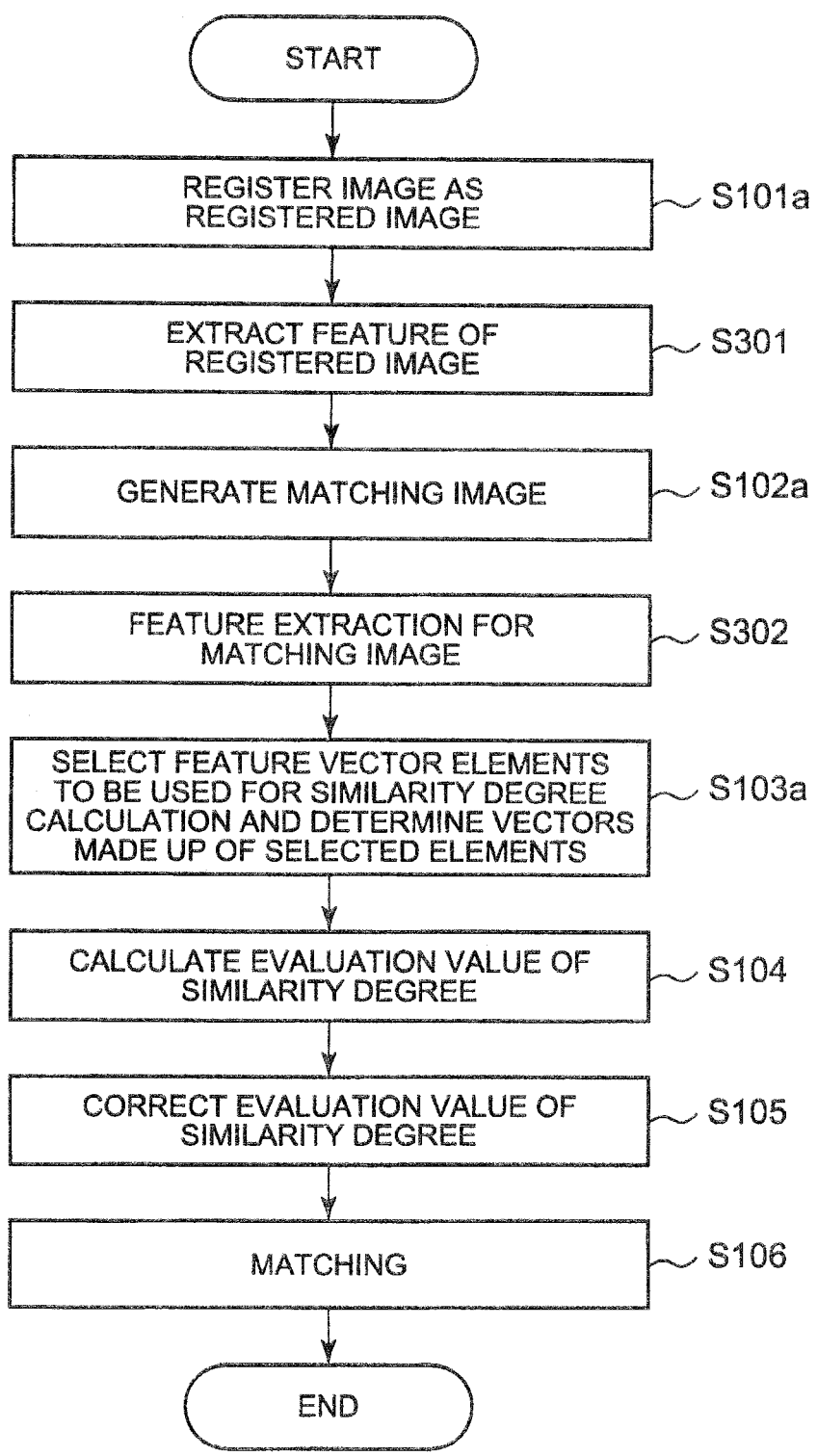
FIG. 15 It depicts a flow chart showing an example of a process flow in the third exemplary embodiment.

Next, the operation of the third exemplary embodiment will be described. FIG. 15 is a flow chart showing an example of a process flow in the third exemplary embodiment, wherein steps equivalent to those in the first or second exemplary embodiment are assigned the same reference characters as in FIG. 6 or 12. The registration-side photographing means 7 photographs an object as a target of the registration and stores an image of the object (registered image) in the data storage means 71 (see FIG. 7, not shown in FIG. 13) (step S101*a*).

Subsequently, the registration-side feature extraction means 9 determines the registration-side feature vector by executing the feature extraction to the registered image (step S301). The registration-side feature extraction means 9 may temporarily store the registration-side feature vector in the data storage means 71 (not shown in FIG. 13). In the step S301, the registration-side feature extraction means 9 may execute the transformation for removing brightness variation at a low frequency to the registered image and determine a vector having the pixel values of the transformed image as its elements as the registration-side feature vector, for example. The registration-side feature extraction means 9 may also execute the transformation for detecting edges to the registered image by employing the filter illustrated in FIG. 14 or the technique described in the Non-patent Literature 5 and determine a vector having the pixel values of the transformed image as its elements as the registration-side feature vector. The type of the transformation for the feature extraction is not particularly restricted; the transformation may be executed in different ways.

The matching-side photographing means 8 photographs an object as a target of the matching and thereby generates an image of the object (matching image) (step S102*a*). Subsequently, the matching-side feature extraction means 10 determines the matching-side feature vector by executing the feature extraction to the matching image (step S302). The method of this feature extraction (transformation) is equivalent to that employed by the registration-side feature extraction means 9.

The subsequent operation is equivalent to that in the second exemplary embodiment. Namely, the matching feature selecting means 3a selects pixel values of pixels in non-hidden areas from the registration-side feature vector and the matching-side feature vector. Then, the matching feature selecting means 3a determines the registration-side selected element vector having the pixel values selected from the registered image as its elements and the matching-side selected element vector having the pixel values selected from the matching image as its elements and outputs the registration-side selected element vector and the matching-side selected element vector to the pre-correction evaluation value calculation means 4 (step S103a). The matching feature selecting means 3a also outputs the number of elements of the registration-side selected element vector to the evaluation value correction means 5 as the number of elements used for the similarity degree calculation.

Subsequently, the pre-correction evaluation value calculation means 4 calculates the evaluation value D of the similarity degree between the matching image and the registered image using the registration-side selected element vector and the matching-side selected element vector (step S104). The evaluation value correction means 5 corrects the evaluation value D so that the increment of the evaluation value increases with the increase in the number of vector elements used for the similarity degree calculation (step S105). The matching judgment means 6 matches the object represented by the matching image with the object represented by the registered image based on the evaluation value Dc after the correction (step S106).

Also in this exemplary embodiment, a highly accurate similarity degree, not having the tendency to increase when the number of vector elements used for the similarity degree calculation is small, can be calculated.

Fourth Exemplary Embodiment

A matching device in accordance with a fourth exemplary embodiment comprises the registration-side photographing means 7, the matching-side photographing means 8, the data storage means 71 and the information processing device 72 similarly to the second and third exemplary embodiments (see FIG. 7) and executes the feature extraction similarly to the third exemplary embodiment. In the fourth exemplary embodiment, however, the correction is made based not on the number of vector elements used for the similarity degree calculation but on the square measure (the number of pixels) of an area that is used for the similarity degree calculation in both of the given registered image and matching image.

Figure 16:
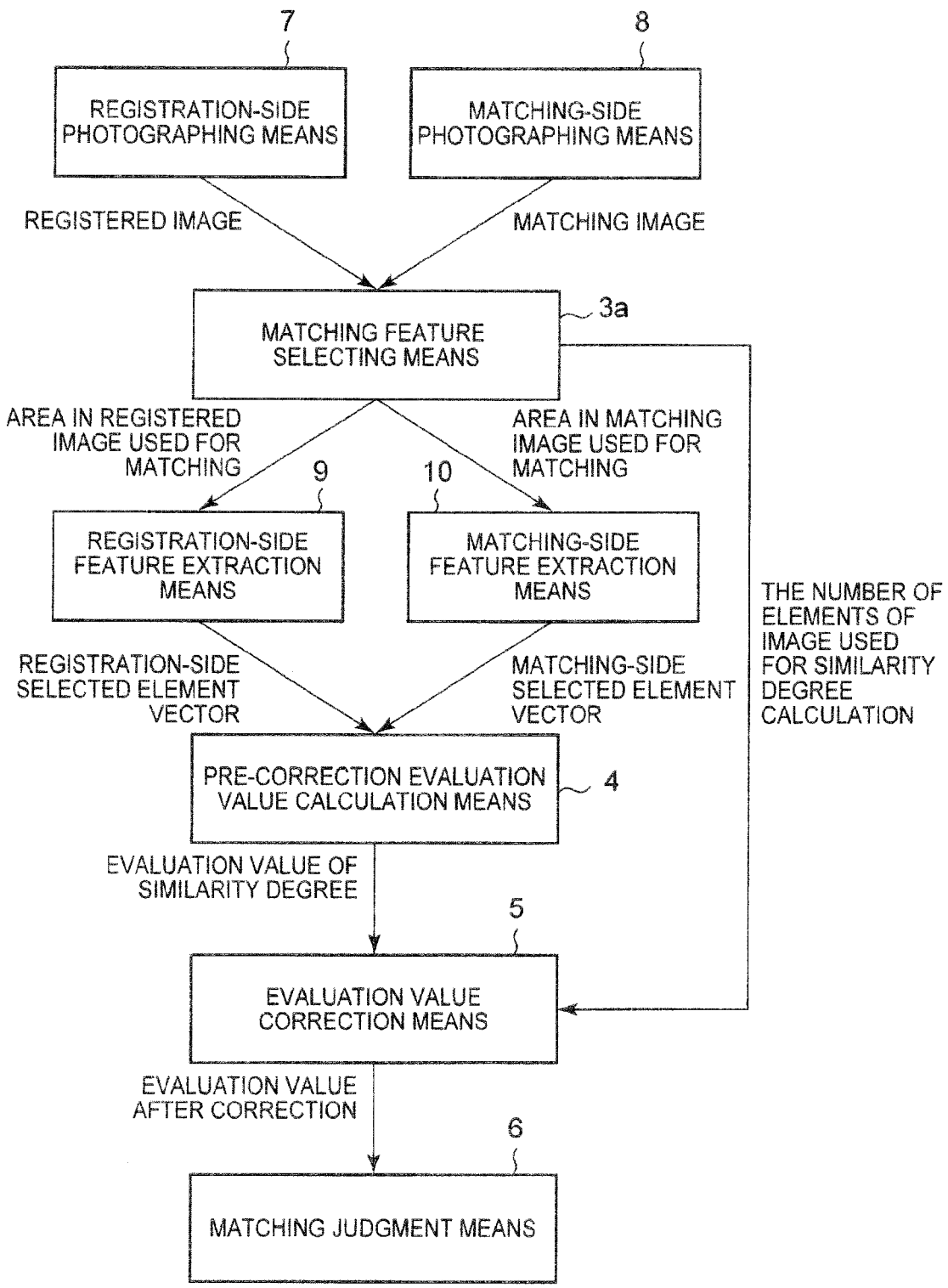
FIG. 16 It depicts a block diagram showing an example of the configuration of a matching device in accordance with a fourth exemplary embodiment.

FIG. 16 is a block diagram showing an example of the configuration of the matching device in accordance with the fourth exemplary embodiment. The matching device of the fourth exemplary embodiment comprises the registration-side photographing means 7, the matching-side photographing means 8, the matching feature selecting means 3a, the registration-side feature extraction means 9, the matching-side feature extraction means 10, the pre-correction evaluation value calculation means 4, the evaluation value correction means 5 and the matching judgment means 6. The matching device also comprises the data storage means 71 (see FIG. 7) for storing the registered image while it is not shown in FIG. 16. The registration-side photographing means 7, the matching-side photographing means 8 and the matching judgment means 6 are equivalent to those in the third exemplary embodiment, and thus repeated explanation thereof is omitted.

In the fourth exemplary embodiment, the matching feature selecting means 3a determines an area where the hiding has occurred in the object area in the registered image and in the matching image and then determines a non-hidden area where the hiding has occurred in neither the registered image nor the matching image in the registered image and in the matching image. The matching feature selecting means 3a outputs the area determined from the registered image to the registration-side feature extraction means 9 while outputting the area determined from the matching image to the matching-side feature extraction means 10. The area where the hiding has occurred in neither the registered image nor the matching image is the area used for the similarity degree calculation (i.e., the area used for the matching).

The square measure (the number of pixels) of the area determined from the registered image equals that of the area determined from the matching image. The matching feature selecting means 3a outputs the area to the evaluation value correction means 5 as the square measure (the number of pixels) of an image used for the similarity degree calculation.

The registration-side feature extraction means 9 executes the feature extraction to the area in the registered image determined by the matching feature selecting means 3a. The method of the feature extraction is not particularly restricted. For example, the registration-side feature extraction means 9 may execute the transformation for removing brightness variation at a low frequency as illustrated in the third exemplary embodiment. The registration-side feature extraction means 9 may also execute the transformation for detecting edges by employing the filter illustrated in FIG. 14 or the technique described in the Non-patent Literature 5. The enlarging/reducing transformation may also be executed as the feature extraction. The registration-side feature extraction means 9 outputs a vector having the pixel values acquired by the feature extraction (transformation) as its elements to the pre-correction evaluation value calculation means 4 as the registration-side selected element vector.

The matching-side feature extraction means 10 executes the feature extraction to the area in the matching image determined by the matching feature selecting means 3a. The method of the feature extraction is equivalent to that employed by the registration-side feature extraction means 9. The matching-side feature extraction means 10 outputs a vector having the pixel values acquired by the feature extraction as its elements to the pre-correction evaluation value calculation means 4 as the matching-side selected element vector.

The pre-correction evaluation value calculation means 4 calculates the evaluation value D of the similarity degree using the registration-side selected element vector and the matching-side selected element vector. The method of this calculation is equivalent to those in the first through third exemplary embodiments.

The evaluation value correction means 5 corrects the evaluation value D of the similarity degree calculated by the pre-correction evaluation value calculation means 4 according to the square measure of the image used for the similarity degree calculation. This square measure (the number of pixels) is inputted from the matching feature selecting means 3a. The evaluation value correction means 5 corrects the evaluation value D so that the increment of the evaluation value increases with the increase in the area of the image used for the similarity degree calculation. In this correction method, the corrected evaluation value Dc may be calculated according to the expression (2), (4) or (5) by substituting the square measure of the image used for the similarity degree calculation into "A" in the expression. The methods of determining the function f(A) in the expression (2), the corrective weights Wd and Wa in the expression (4), etc. are equivalent to those in the first exemplary embodiment. The fourth exemplary embodiment differs from the third exemplary embodiment in that the correction is made by use of the square measure determined from the registered image and the matching image before the feature extraction.

Also in this exemplary embodiment, the matching feature selecting means 3a, the registration-side feature extraction means 9, the matching-side feature extraction means 10, the pre-correction evaluation value calculation means 4, the evaluation value correction means 5 and the matching judgment means 6 are implemented by, for example, a CPU operating according to a matching program. It is also possible to implement each means by a separate hardware module.

Figure 17:
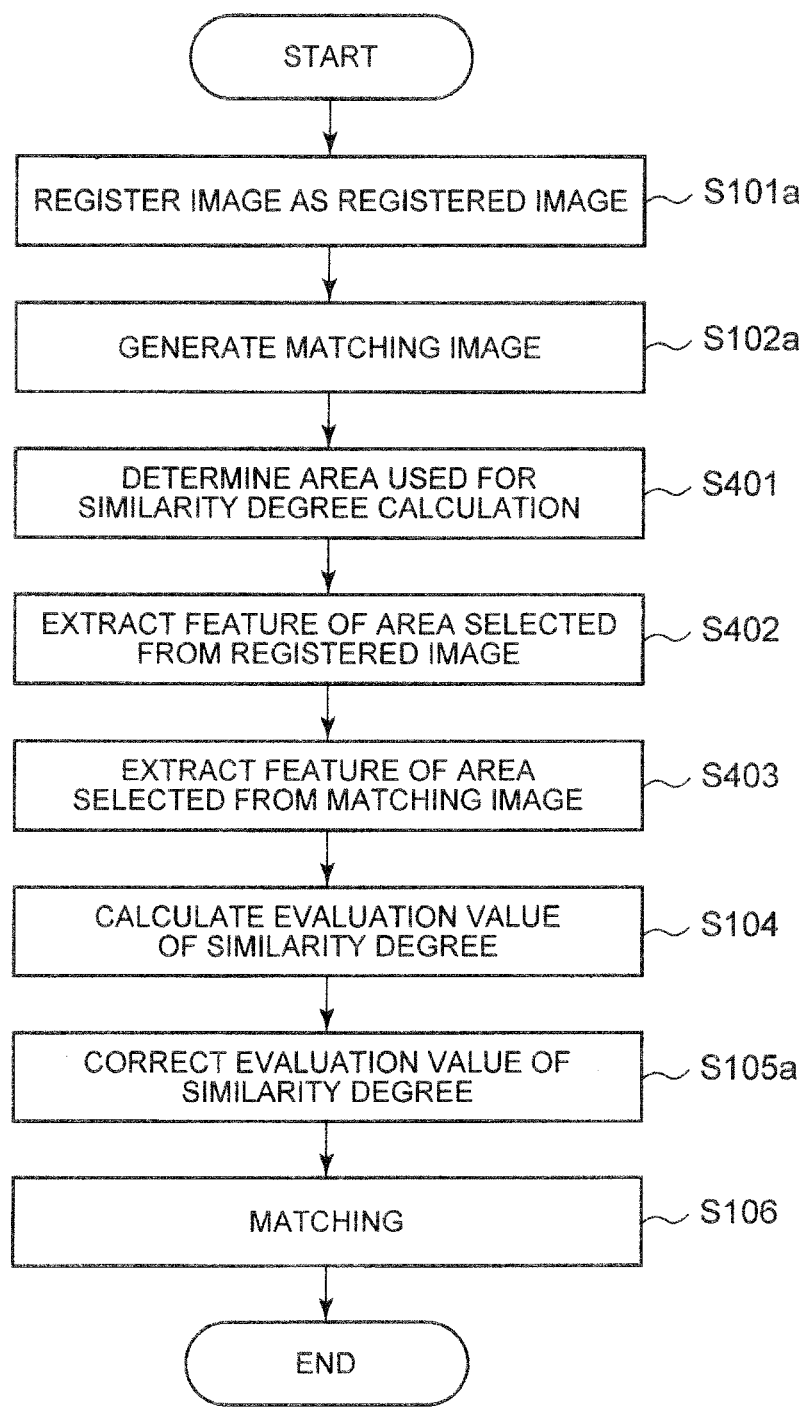
FIG. 17 It depicts a flow chart showing an example of a process flow in the fourth exemplary embodiment.

Next, the operation of the fourth exemplary embodiment will be described. FIG. 17 is a flow chart showing an example of a process flow in the fourth exemplary embodiment. The registration-side photographing means 7 photographs an object as a target of the registration and stores an image of the object (registered image) in the data storage means 71 (see FIG. 7, not shown in FIG. 16) (step S101a). The matching-side photographing means 8 photographs an object as a target of the matching and thereby generates an image of the object (matching image) (step S102a). The steps S101a and S102a are equivalent to those in the second and third exemplary embodiments.

Subsequently, the matching feature selecting means 3a determines an area where the hiding has occurred in the object area in the registered image stored in the data storage means 71 (see FIG. 7) and in the matching image generated in the step S102a and further determines an area where the hiding has occurred in neither the registered image nor the matching image (step S401). This area is the area used for the similarity degree calculation. The judgment on the area where the hiding has occurred may be made similarly to the second exemplary embodiment.

The matching feature selecting means 3a outputs the area determined from the registered image as an area used for the similarity degree calculation to the registration-side feature extraction means 9. Similarly, the matching feature selecting means 3a also outputs the area determined from the matching image as an area used for the similarity degree calculation to the matching-side feature extraction means 10. The matching feature selecting means 3a also outputs the square measure (the number of pixels) of the area used for the similarity degree calculation to the evaluation value correction means 5. Assuming that a matching image in which the hiding has occurred and a registered image have been given as shown in FIG. 11(a), for example, the matching feature selecting means 3a determines the area 62 (see FIG. 11(b)) where the hiding has occurred in the matching image. Then, the matching feature selecting means 3a determines the area in the matching image excluding the area 62 and the area in the registered image excluding the area 61 as the areas where the hiding has occurred in neither the registered image nor the matching image. The matching feature selecting means 3a outputs the area obtained by excluding the area 61 from the registered image to the registration-side feature extraction means 9 while outputting the area obtained by excluding the area 62 from the matching image to the matching-side feature extraction means 10. The square measure (the number of pixels) of the area obtained by excluding the area 61 from the registered image equals that of the area obtained by excluding the area 62 from the matching image. The matching feature selecting means 3a outputs the square measure to the evaluation value correction means 5.

Subsequently, the registration-side feature extraction means 9 executes the feature extraction to the image area of the registered image inputted from the matching feature selecting means 3a and determines a vector having the pixel values acquired by the feature extraction as its elements as the registration-side selected element vector (step S402). For example, when an area obtained by excluding the area 61 from the registered image shown in FIG. 11(b) is inputted, the registration-side feature extraction means 9 executes the feature extraction to the area other than the area 61 and determines the registration-side selected element vector having the pixel values acquired by the feature extraction as its elements.

Similarly, the matching-side feature extraction means 10 executes the feature extraction to the image area of the matching image inputted from the matching feature selecting means 3a and determines a vector having the pixel values acquired by the feature extraction as its elements as the matching-side selected element vector (step S403). The method of the feature extraction (transformation) in the step S403 is identical with that in the step S402.

Subsequently, the pre-correction evaluation value calculation means 4 calculates the evaluation value D of the similarity degree between the matching image and the registered image using the registration-side selected element vector and the matching-side selected element vector determined in the steps S402 and S403 (step S104). This step S104 is equivalent to those in the first through third exemplary embodiments.

Subsequently, the evaluation value correction means 5 corrects the evaluation value D so that the increment of the evaluation value increases with the increase in the area (the number of pixels) of the image used for the similarity degree calculation by use of the area inputted from the matching feature selecting means 3a (step S105a). The calculation method itself for the correction is equivalent to those in the first through third exemplary embodiments. However, this exemplary embodiment differs from the third exemplary embodiment in that the correction is made by use of the square measure (the number of pixels) determined from the registered image and the matching image before undergoing the feature extraction processes in the steps S402 and S403.

Subsequently, the matching judgment means 6 matches the object represented by the matching image with the object represented by the registered image based on the evaluation value Dc after the correction (step S106). This operation is equivalent to those in the first through third exemplary embodiments.

In this exemplary embodiment, the final evaluation value Dc is determined by correcting the evaluation value D of the similarity degree so that the increment of the evaluation value increases with the increase in the area used for the similarity degree calculation in the registered image and the matching image. Therefore, even when the square measure used for the similarity degree calculation is small and consequently the number of vector elements used for the similarity degree calculation is necessitated to be small, the similarity degree's tendency to increase can be eliminated and a highly accurate similarity degree can be calculated.

Fifth Exemplary Embodiment

A matching device in accordance with a fifth exemplary embodiment comprises the registration-side photographing means 7, the matching-side photographing means 8, the data storage means 71 and the information processing device 72 similarly to the second exemplary embodiment (see FIG. 7). In the aforementioned second exemplary embodiment, the evaluation value of the similarity degree was corrected based on the number of elements of the registration-side selected element vector and the matching-side selected element vector. In this fifth exemplary embodiment, the number of vector elements effective for the similarity degree calculation is further determined from the registration-side selected element vector and the matching-side selected element vector, and the evaluation value of the similarity degree is corrected based on the number of vector elements effective for the similarity degree calculation.

Figure 18:
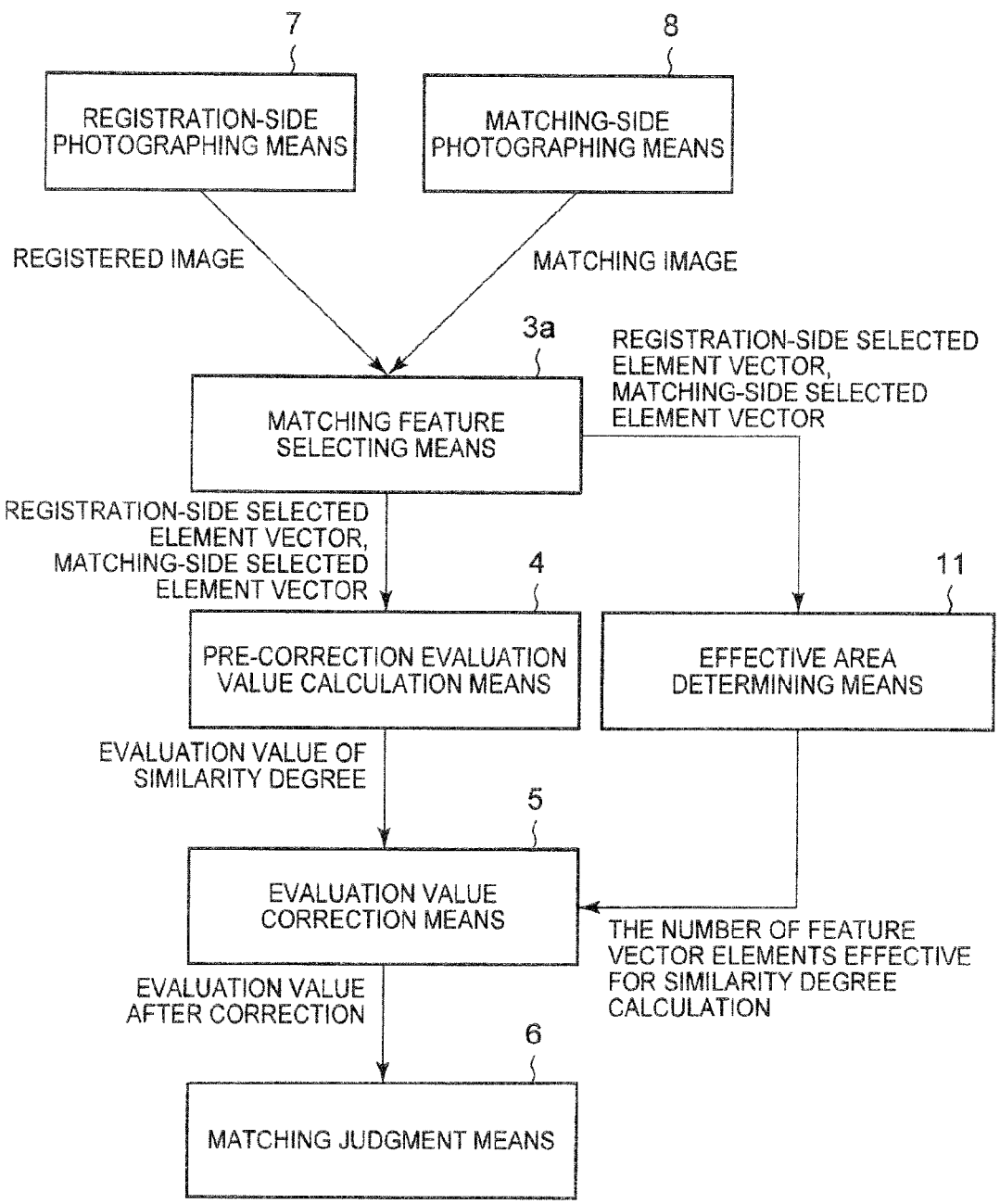
FIG. 18 It depicts a block diagram showing an example of the configuration of a matching device in accordance with a fifth exemplary embodiment.

FIG. 18 is a block diagram showing an example of the configuration of the matching device in accordance with the fifth exemplary embodiment. Components equivalent to those in the first or second exemplary embodiment are assigned the same reference character as in FIG. 2 or 8 and detailed explanation thereof is omitted. The matching device of the fifth exemplary embodiment comprises the registration-side photographing means 7, the matching-side photographing means 8, the matching feature selecting means 3a, effective area determining means 11, the pre-correction evaluation value calculation means 4, the evaluation value correction means 5 and the matching judgment means 6.

The effective area determining means 11 extracts vector elements effective for the similarity degree calculation from the registration-side selected element vector and the matching-side selected element vector determined by the matching feature selecting means 3a and outputs the number of the extracted elements to the evaluation value correction means 5. The number of the vector elements effective for the similarity degree calculation can be regarded as the square measure (two dimensional size) of an area effective for the similarity degree calculation in the registered image and the matching image.

The area regarded as effective for the similarity degree calculation means an area where individuality of the object has appeared in the image. For example, when the matching image is photographed under a condition where there is great variation in the illumination status, shadowy parts and parts with blown-out highlights can occur in the illuminated image. The individuality of the object does not appear in such parts with shadows or blown-out highlights. Such areas are also used for the similarity degree calculation since the hiding has not necessarily occurred in such areas. However, if the square measure (the number of pixels) of such areas where the individuality of the object does not appear is large, the areas where the individuality of the object has not appeared contribute to an increase in the similarity degree when the correction is made. In other words, if the square measure of the parts where hiding does not appear and shadows or blown-out highlights appear is large, the similarity degree tends to be calculated higher than the original similarity degree. The effective area determining means 11 determines the square measure (the number of pixels) of areas where the individuality of the object has appeared, that is, the square measure of areas effective for the similarity degree calculation.

For example, since the pixel value (brightness value) is extremely low in the shadowy parts, it is possible to previously set a threshold value for judging whether each pixel value corresponds to a pixel value in such an area or not (hereinafter referred to as a "shadow-excluding threshold value"). The effective area determining means 11 may determine the number of vector elements whose value (pixel value) is the shadow-excluding threshold value or higher from the registration-side selected element vector and the matching-side selected element vector. "The value of a vector element is the shadow-excluding threshold value or higher" means that the element does not correspond to a shadowy part. Thus, the number of elements determined as above represents the square measure of effective areas which are not shadowy.

Similarly, since the brightness is extremely high in the parts with blown-out highlights, it is possible to previously set a threshold value for judging whether each pixel value corresponds to a pixel value (brightness value) in such an area or not (hereinafter referred to as a "highlight-excluding threshold value"). The effective area determining means 11 may determine the number of vector elements whose value is the highlight-excluding threshold value or lower from the registration-side selected element vector and the matching-side selected element vector. "The value of a vector element is the highlight-excluding threshold value or lower" means that the element does not correspond to a part with blown-out highlights. Thus, the number of elements determined as above represents the square measure of effective areas without blown-out highlights.

The threshold values such as the shadow-excluding threshold value and the highlight-excluding threshold value may either be determined manually or previously determined by a learning process.

The vector elements effective for the similarity degree calculation may be determined by extracting vector elements satisfying multiple conditions from the registration-side selected element vector and the matching-side selected element vector. For example, it is possible to extract vector elements whose value is the shadow-excluding threshold value or higher and the highlight-excluding threshold value or lower.

In this exemplary embodiment, the evaluation value correction means 5 corrects the evaluation value of the similarity degree based on the number of vector elements effective for the similarity degree calculation (the square measure of effective areas) inputted from the effective area determining means 11. Specifically, the evaluation value correction means 5 corrects the evaluation value so that the increment of the evaluation value increases with the increase in the number of vector elements effective for the similarity degree calculation. The calculation method for the correction is equivalent to those in other exemplary embodiments. For example, the correction of the evaluation value D may be made by executing calculation according to the expressions (2), (4), (5), etc. The function f(A) in the expression (2), the corrective weights Wd and Wa in the expression (4) and the function f(D, A) in the expression (5) may be determined previously.

The effective area determining means 11 is implemented by, for example, a CPU operating according to a matching program. In this case, the CPU operates as the effective area determining means 11 and other means 3a, 4, 5 and 6 according to the matching program. It is also possible to implement each means by a separate hardware module.

Figure 19:
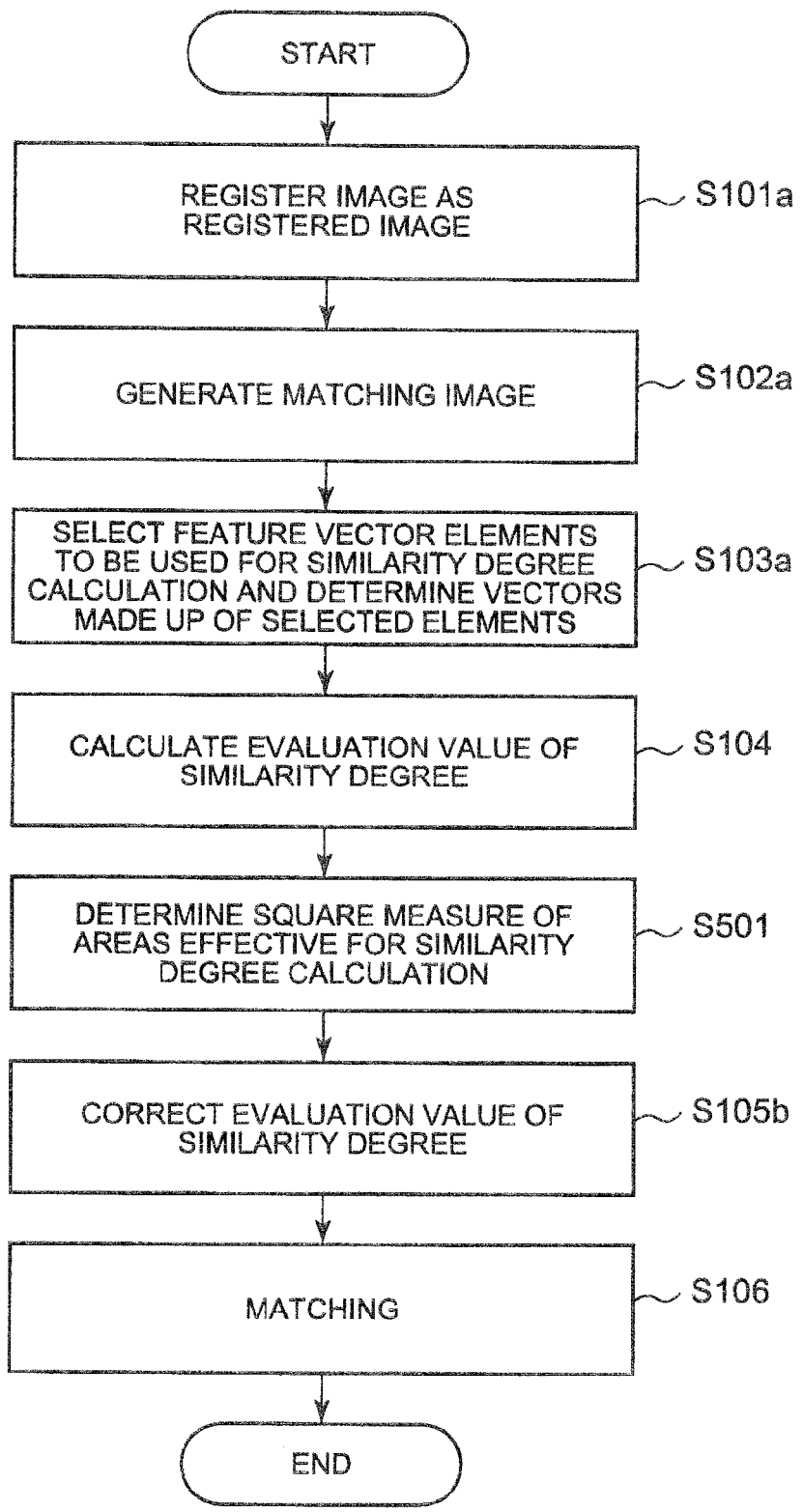
FIG. 19 It depicts a flow chart showing an example of a process flow in the fifth exemplary embodiment.
Figure 20:
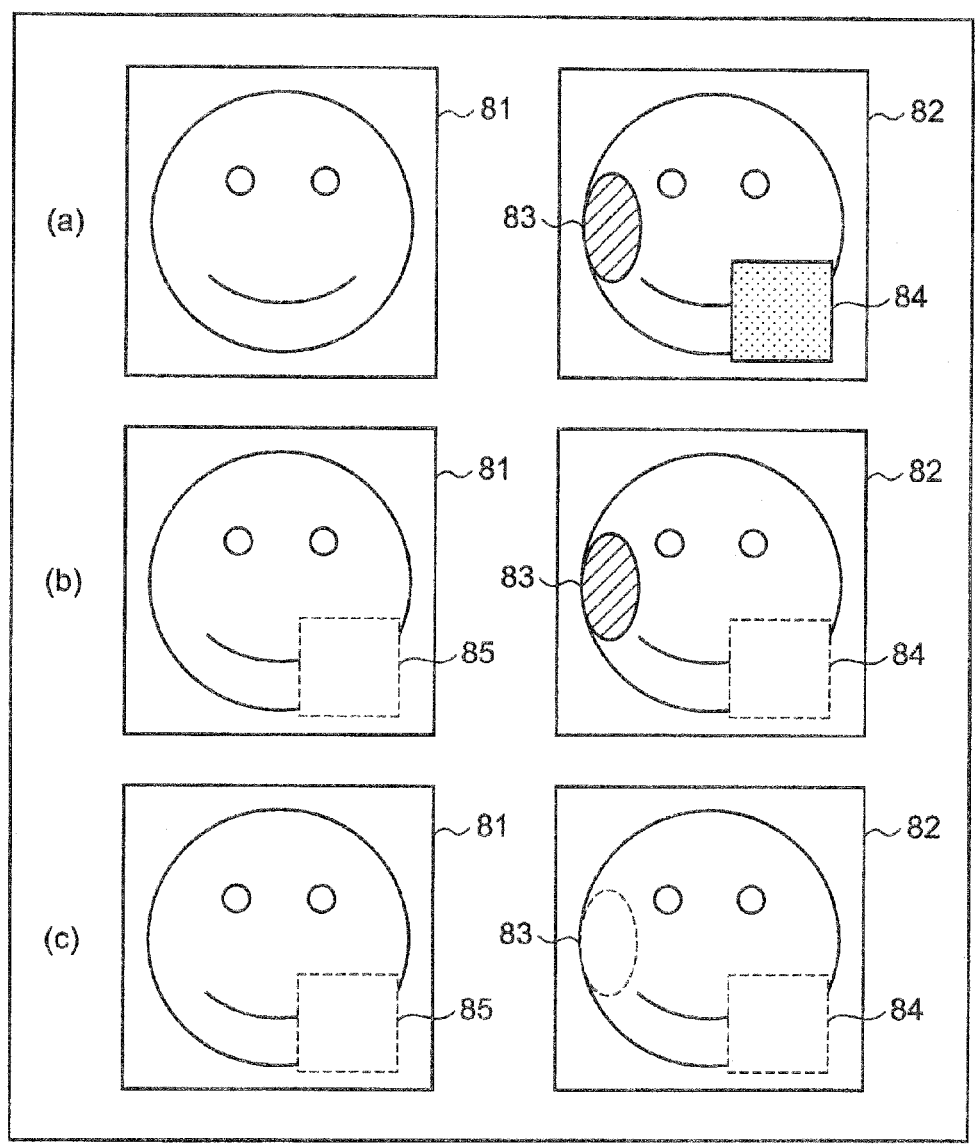
FIG. 20 It depicts an explanatory drawing schematically explaining the process in the fifth exemplary embodiment.

Next, the operation of the fifth exemplary embodiment will be described. FIG. 19 is a flow chart showing an example of a process flow in the fifth exemplary embodiment, wherein steps equivalent to those in the first or second exemplary embodiment are assigned the same reference characters as in FIG. 6 or 12. FIG. 20 is an explanatory drawing schematically explaining the process in the fifth exemplary embodiment.

The registration-side photographing means 7 photographs an object as a target of the registration and stores an image of the object (registered image) in the data storage means 71 (see FIG. 7, not shown in FIG. 18) (step S101a). Thereafter, the matching-side photographing means 8 photographs an object as a target of the matching and thereby generates an image of the object (matching image) (step S102a). Subsequently, the matching feature selecting means 3a determines areas in each of the registered/matching images where the hiding has occurred in the object area, and selects pixel values of pixels in areas where the hiding has occurred in neither the registered image nor the matching image as the vector elements. Then, the matching feature selecting means 3a determines the registration-side selected element vector having the pixel values selected from the registered image as its elements and the matching-side selected element vector having the pixel values selected from the matching image as its elements (step S103a). The steps S101a-S103a are equivalent to those in the second exemplary embodiment. However, the matching feature selecting means 3a in this fifth exemplary embodiment outputs the registration-side selected element vector and the matching-side selected element vector to the pre-correction evaluation value calculation means 4 and the effective area determining means 11.

For example, when the similarity degree calculation is executed for a registered image 81 and a matching image 82 illustrated in FIG. 20(a), a shadow area 83 corresponding to a shadow and a hidden area 84 exist in the matching image 82. In this case, the matching feature selecting means 3a selects an area other than an area 85 corresponding to the hidden area 84 from the registered image 81 and determines a registration-side selected element vector having the pixel values in the selected area as its vector elements (see FIG. 20(b)). Meanwhile, the matching feature selecting means 3a selects an area other than the hidden area 84 from the matching image 82 and determines a matching-side selected element vector having the pixel values in the selected area as its vector elements (see FIG. 20(b)). The matching-side selected element vector includes also elements corresponding to pixels in the shadow area 83.

After the step S103a, the pre-correction evaluation value calculation means 4 calculates the evaluation value D of the similarity degree between the matching image and the registered image using the registration-side selected element vector and the matching-side selected element vector (step S104). The step S104 is equivalent to those in the first and second exemplary embodiments. The calculation in the step S104 is executed using also the values of the vector elements corresponding to the shadowy part.

Meanwhile, the effective area determining means 11 determines the square measure of the areas effective for the similarity degree calculation by referring to the registration-side selected element vector and the matching-side selected element vector (step S501). Concretely, the effective area determining means 11 extracts vector elements effective for the similarity degree calculation from the registration-side selected element vector and the matching-side selected element vector. For example, the effective area determining means 11 extracts vector elements whose values are the shadow-excluding threshold value or higher. In this example, from the registration-side selected element vector, elements corresponding to pixels of the registered image 81 other than the area 85 are extracted. Meanwhile, from elements of the matching-side selected element vector corresponding to pixels of the matching image 82 other than the hidden area 84, elements corresponding to pixels outside the shadow area 83 are extracted. The effective area determining means 11 determines the number of element pairs as the square measure of the areas effective for the similarity degree calculation, where the pairs are made up of corresponding elements extracted from the registration-side selected element vector and the matching-side selected element vector. For example, elements corresponding to pixels corresponding to the shadow area 83 are extracted from the registration-side selected element vector, whereas elements corresponding to the shadow area 83 are not extracted from the matching-side selected element vector. Therefore, among the elements extracted from the registration-side selected element vector, the elements corresponding to the pixels corresponding to the shadow area 83 are not counted for the determination of the square measure of the areas effective for the similarity degree calculation. In the example shown in FIG. 20(c), the result of the counting by the effective area determining means 11 equals the square measure of the part (corresponding part) that is common to the registered image 81 excluding the area 85 and the matching image 82 excluding the areas 83 and 84.

The effective area determining means 11 may also calculate the average between the number of elements extracted from the registration-side selected element vector as the vector elements effective for the similarity degree calculation and the number of elements extracted from the matching-side selected element vector as the vector elements effective for the similarity degree calculation. This average is the average between the square measure of the areas in the registered image effective for the similarity degree calculation and the square measure of the areas in the matching image effective for the similarity degree calculation. This average may also be used as the square measure of the areas effective for the similarity degree calculation.

After determining the area of the square measure (the number of vector elements) effective for the similarity degree calculation, the effective area determining means 11 outputs the area to the evaluation value correction means 5.

Subsequently, the evaluation value correction means 5 corrects the evaluation value D of the similarity degree based on the square measure of the areas (the number of vector elements) effective for the similarity degree calculation calculated in the step S501 (step S105b). In the step S105b, the evaluation value correction means 5 corrects the evaluation value D so that the increment of the evaluation value increases with the increase in the square measure of the areas effective for the similarity degree calculation. The calculation method itself for the correction is equivalent to that in the second exemplary embodiment. However, this exemplary embodiment differs from the second exemplary embodiment in that the correction is made by use of the square measure of the areas (the number of vector elements) effective for the similarity degree calculation.

Subsequently, the matching judgment means 6 matches the object represented by the matching image with the object represented by the registered image based on the evaluation value Dc after the correction (step S106). This operation is equivalent to that in the second exemplary embodiment.

Incidentally, while a case where a shadow area has occurred in an image is illustrated in FIG. 20, the process can be executed similarly also when a highlight area has occurred in an image. Further, while a case where a shadow area has occurred in the matching image 82 is taken as an example in FIG. 20, the process can be executed similarly also when a shadow area or a highlight area has occurred in the registered image 81 or in both the registered image 81 and the matching image 82.

In this exemplary embodiment, the square measure of areas effective for the similarity degree calculation (e.g., areas without shadows or blown-out highlights) is focused on and the evaluation value D of the similarity degree is corrected so that the increment of the evaluation value increases with the increase in the area. Therefore, the increase in the corrected evaluation value can be prevented when the shadow/highlight area is large, and a highly accurate similarity degree can be determined. Consequently, the matching performance can be enhanced.

While the effective area determining means 11 is employed for the second exemplary embodiment in the above explanation of the fifth exemplary embodiment, it is also possible to employ the effective area determining means 11 for the third exemplary embodiment and make the evaluation value correction in the third exemplary embodiment based on the square measure of the areas (effective for the similarity degree calculation) determined by the effective area determining means 11.

Sixth Exemplary Embodiment

A matching device in accordance with a sixth exemplary embodiment comprises the registration-side photographing means 7, the matching-side photographing means 8, the data storage means 71 and the information processing device 72 similarly to the second through fifth exemplary embodiments (see FIG. 7). In the above fifth exemplary embodiment, the judgment on the areas effective for the similarity degree calculation was made based on the registration/matching images themselves. In contrast, in this sixth exemplary embodiment, when the similarity degree between the matching image and a certain registered image is calculated, the areas effective for the calculation of the similarity degree between the matching image and the registered image are judged and determined from a whole set of images, by taking account of not only the matching image and the registered image but also other registered images stored in the data storage means 71.

Figure 21:
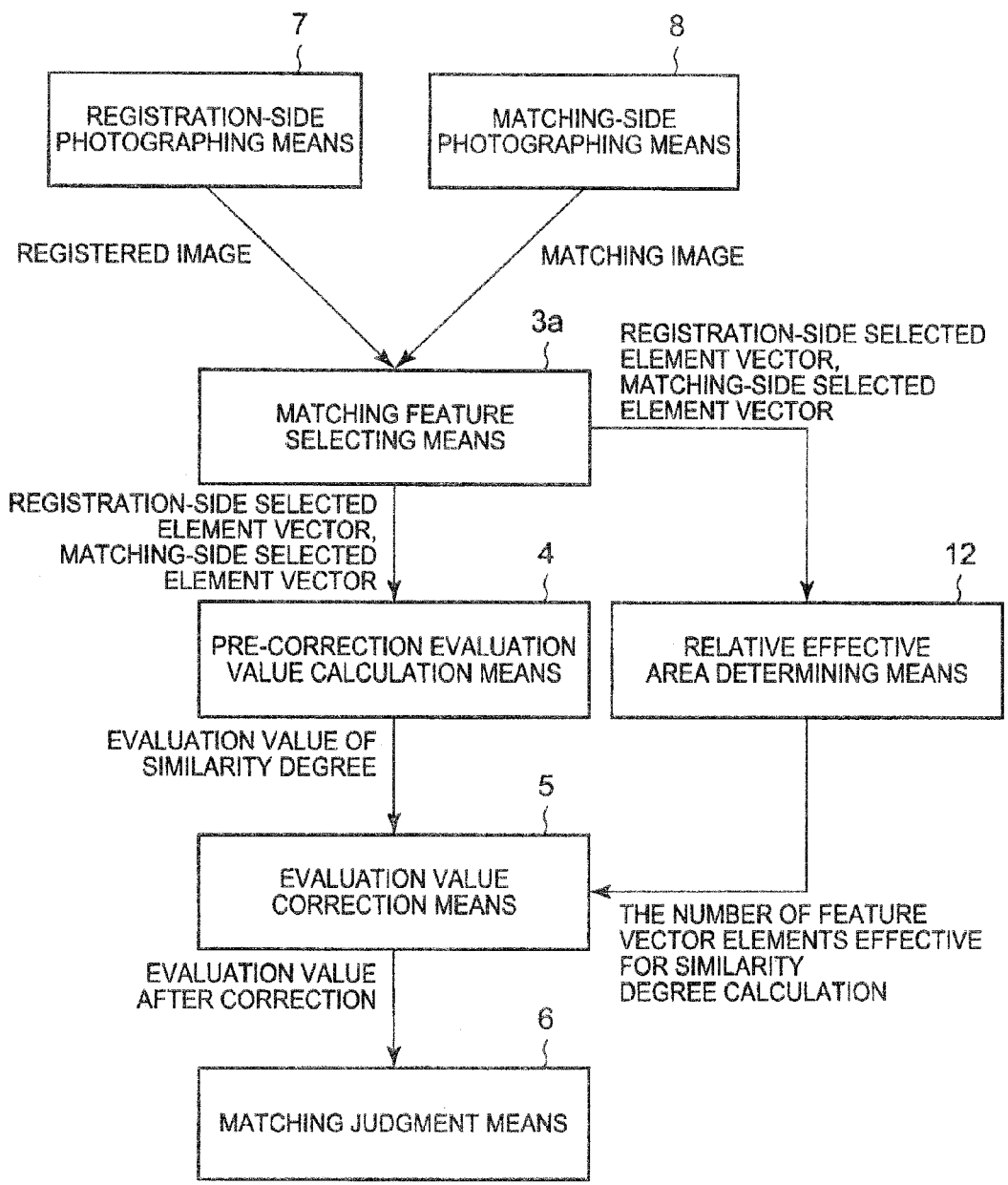
FIG. 21 It depicts a block diagram showing an example of the configuration of a matching device in accordance with a sixth exemplary embodiment.

FIG. 21 is a block diagram showing an example of the configuration of the matching device in accordance with the sixth exemplary embodiment. Components equivalent to those in the fifth exemplary embodiment are assigned the same reference character as in FIG. 18 and detailed explanation thereof is omitted. The matching device of the sixth exemplary embodiment comprises the registration-side photographing means 7, the matching-side photographing means 8, the matching feature selecting means 3a, relative effective area determining means 12, the pre-correction evaluation value calculation means 4, the evaluation value correction means 5 and the matching judgment means 6.

The relative effective area determining means 12 measures/counts the square measure of the areas (the number of vector elements) effective for the similarity degree calculation by judging whether a pixel position corresponding to a vector element belong to an area effective for the similarity degree calculation or not in regard to each pair of vector elements corresponding to each other in the registration-side selected element vector and the matching-side selected element vector determined by the matching feature selecting means 3a.

In this exemplary embodiment, however, a pixel at which the brightness variation (dispersion (variance) of brightness) among pixels corresponding to one another in the registered images stored in the data storage means 71 (see FIG. 7) and the inputted matching image is great is judged to belong to an area effective for the similarity degree calculation. If the brightness variation among corresponding pixels in multiple images is great at a pixel, the pixel can be regarded as a pixel in an area well representing the individuality of the object in the image. In contrast, if the brightness variation among corresponding pixels in multiple images is small at a pixel, the pixel does not represent much the individuality of the object in the image.

For example, for each pair of vector elements corresponding to each other in the registration-side selected element vector and the matching-side selected element vector, the relative effective area determining means 12 extracts pixel values at pixel positions corresponding to the vector element pair from the registered images and the matching image and calculates the variance of the extracted pixel values. If the variance is a prescribed threshold value or more, the relative effective area determining means 12 judges that the vector elements under consideration in the registration-side selected element vector and the matching-side selected element vector correspond to pixels in the areas effective for the similarity degree calculation. The relative effective area determining means 12 makes the same judgment for each pair of vector elements corresponding to each other in the registration-side selected element vector and the matching-side selected element vector. The number of vector elements of the registration-side selected element vector judged to correspond to pixels in the areas effective for the similarity degree calculation is equal to the number of vector elements of the matching-side selected element vector judged to correspond to pixels in the areas effective for the similarity degree calculation. The relative effective area determining means 12 counts the number of such vector elements as the square measure of the areas effective for the similarity degree calculation.

As above, in the sixth exemplary embodiment, the dispersion (variance) of pixel values among images is calculated for each pixel position by taking account of not only the registered image and the matching image which are target of similarity degree calculation but also other stored registered images. Therefore, even if the registered image and the matching image, which are target of similarity degree calculation, do not change, the areas judged to be effective for the similarity degree calculation change when there is a change in the other stored registered images.

For comparison, in the fifth exemplary embodiment, the judgment on the areas effective for the similarity degree calculation is made based on the registered image and the matching image as similarity degree calculation target images and the threshold values (e.g., the shadow-excluding threshold value), and thus the other registered images have no effect on the judgment. In contrast, in the sixth exemplary embodiment, the variance of pixel values is calculated for each pixel position from the whole set of images and the judgment on the areas effective for the similarity degree calculation is made by use of the calculated variance. Thus, in the sixth exemplary embodiment, the judgment on the areas effective for the similarity degree calculation is made adaptively based on the whole set of images including the matching image and the prepared registered images.

The threshold value to be compared with the variance may either be determined manually or previously determined by a learning process.

In the sixth exemplary embodiment, the evaluation value correction means 5 corrects the evaluation value of the similarity degree based on the square measure of the areas effective for the similarity degree calculation inputted from the relative effective area determining means 12. Namely, the evaluation value correction means 5 corrects the evaluation value so that the increment of the evaluation value increases with the increase in the square measure of the areas effective for the similarity degree calculation. The calculation method for the correction is equivalent to those in other exemplary embodiments. For example, the correction of the evaluation value D may be made by executing calculation according to the expressions (2), (4), (5), etc. The function f(A) in the expression (2), the corrective weights Wd and Wa in the expression (4) and the function f(D, A) in the expression (5) may be determined previously.

The relative effective area determining means 12 is implemented by, for example, a CPU operating according to a matching program. In this case, the CPU operates as the relative effective area determining means 12 and other means 3a, 4, 5 and 6 according to the matching program. It is also possible to implement each means by a separate hardware module.

Figure 22:
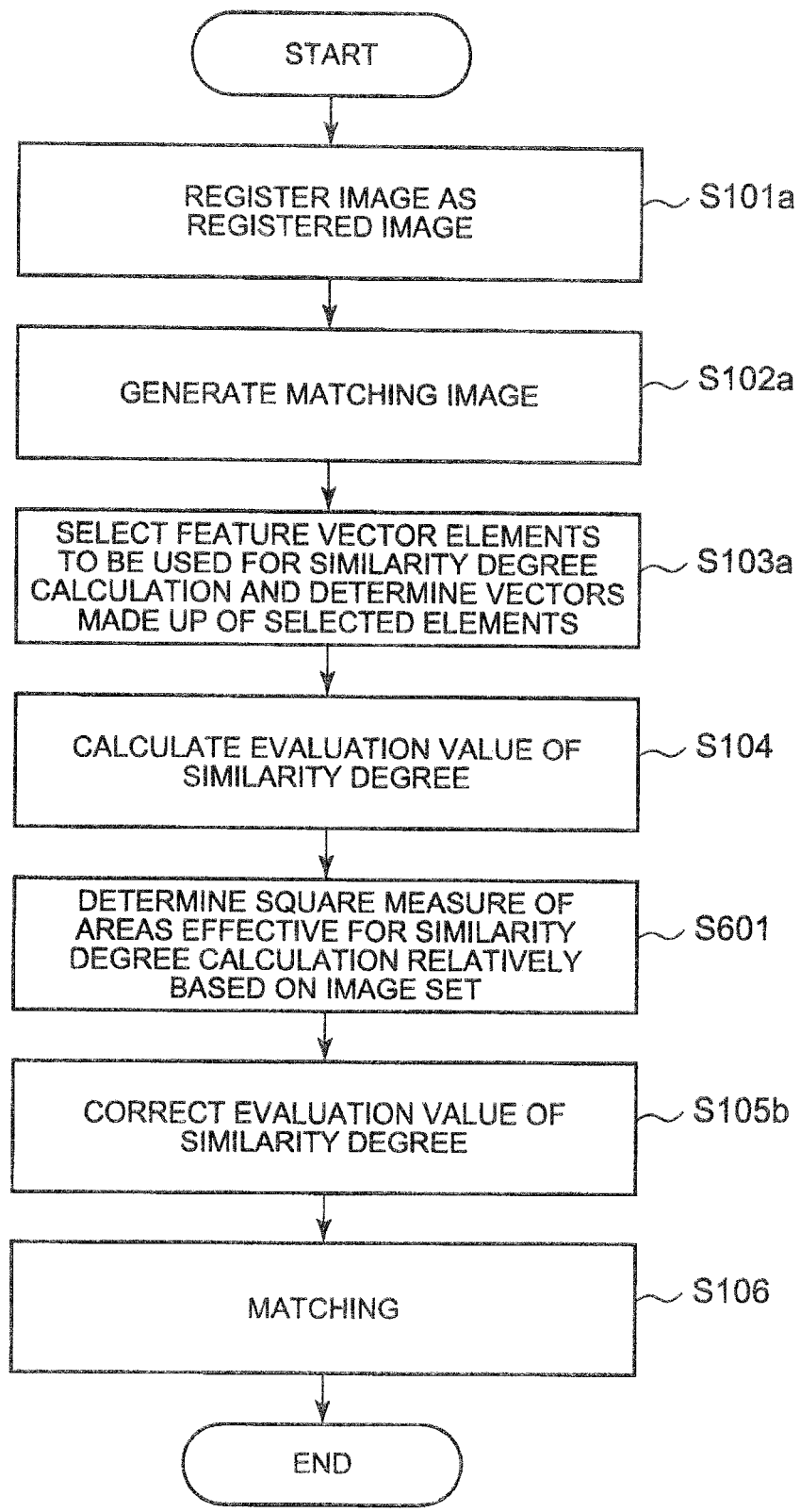
FIG. 22 It depicts a flow chart showing an example of a process flow in the sixth exemplary embodiment.

Next, the operation of the sixth exemplary embodiment will be described. FIG. 22 is a flow chart showing an example of a process flow in the sixth exemplary embodiment. Steps equivalent to those in the fifth exemplary embodiment are assigned the same reference characters as in FIG. 19 and repeated explanation thereof is omitted. The process until the matching feature selecting means 3a determines the registration-side selected element vector and the matching-side selected element vector (steps S101a-103a) is equivalent to that in the fifth exemplary embodiment, and thus repeated explanation thereof is omitted. However, the matching feature selecting means 3a outputs the registration-side selected element vector and the matching-side selected element vector to the pre-correction evaluation value calculation means 4 and the relative effective area determining means 12.

After the step S103a, the pre-correction evaluation value calculation means 4 calculates the evaluation value D of the similarity degree between the matching image and the registered image using the registration-side selected element vector and the matching-side selected element vector (step S104). The step S104 is also equivalent to that in the fifth exemplary embodiment.

Meanwhile, for each pair of vector elements corresponding to each other in the registration-side selected element vector and the matching-side selected element vector, the relative effective area determining means 12 extracts pixel values at pixel positions corresponding to the vector element pair from the registered images and the matching image and calculates the variance of the extracted pixel values. If the variance is a prescribed threshold value or more, the relative effective area determining means 12 judges that the vector elements under consideration in the registration-side selected element vector and the matching-side selected element vector correspond to pixels in the areas effective for the similarity degree calculation. If the variance is less than the threshold value, the relative effective area determining means 12 judges that the vector elements under consideration in the registration-side selected element vector and the matching-side selected element vector do not correspond to pixels in the areas effective for the similarity degree calculation. The relative effective area determining means 12 may make this judgment for each pair of vector elements corresponding to each other in the registration-side selected element vector and the matching-side selected element vector and count the number of vector elements judged to correspond to pixels in the areas effective for the similarity degree calculation as the square measure of the areas effective for the similarity degree calculation (step S601).

Figure 23:
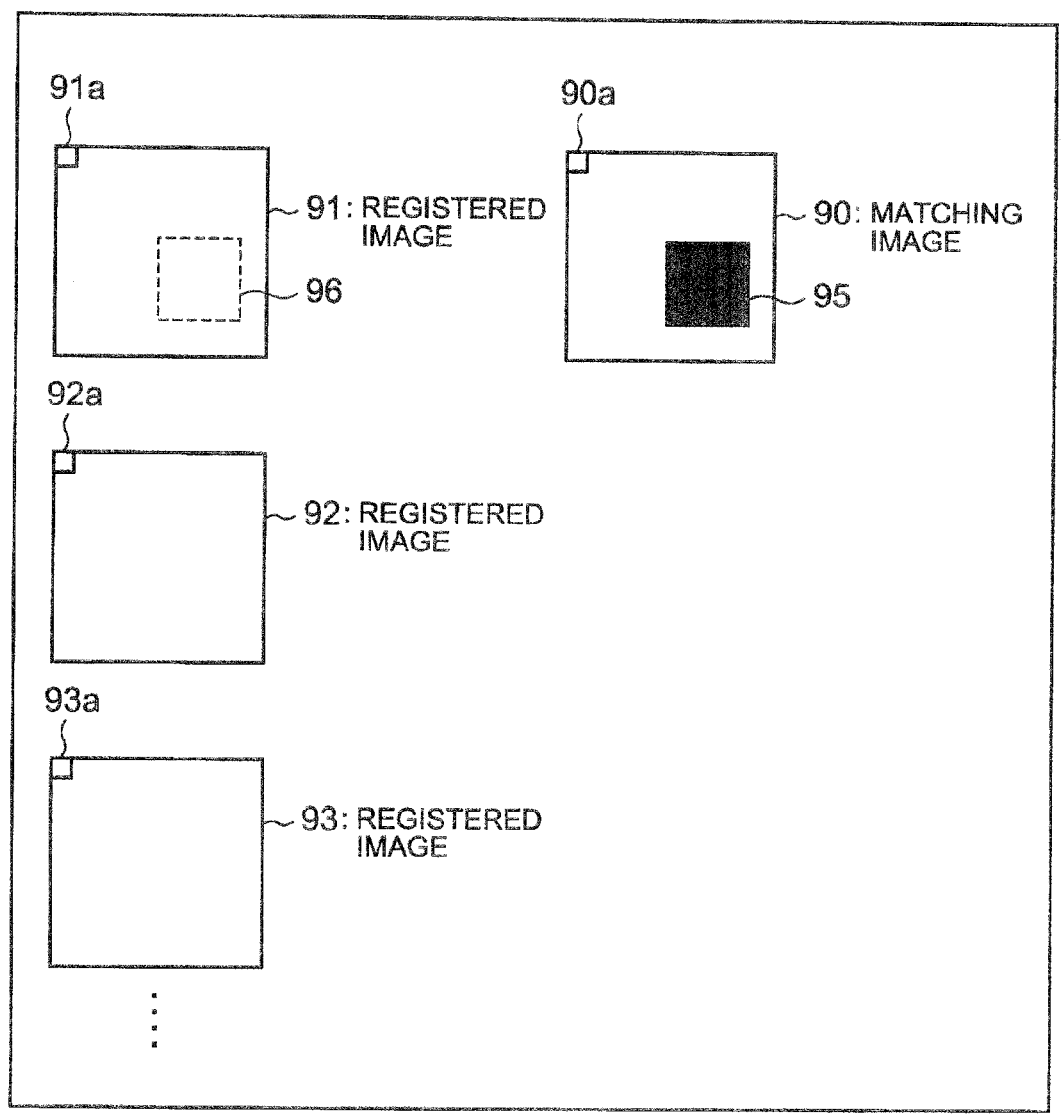
FIG. 23 It depicts an explanatory drawing schematically showing a process in step S601.

FIG. 23 is an explanatory drawing schematically showing the process in the step S601. The similarity degree between a matching image 90 and a registered image 91 shown in FIG. 23 is being calculated. Besides the registered image 91, other registered images 92, 93 . . . , have been registered. It is assumed in this exemplary embodiment that the registered images 91, 92, . . . include no hidden area. Illustration of the object in each image is omitted in FIG. 23. In the example of FIG. 23, pixels 90a, 91a, 92a, 93a, . . . in the images are the pixels at corresponding pixel positions. The relative effective area determining means 12 calculates the variance of the pixel values of these pixels 90a, 91a, 92a, 93a, . . . . If the variance is the threshold value of more, the relative effective area determining means 12 judges that the pixel positions of the pixels 90a and 91a in the similarity degree calculation target images 90 and 91 correspond to the areas effective for the similarity degree calculation. The relative effective area determining means 12 makes this judgment for each pair of pixel positions corresponding to each other in the similarity degree calculation target images 90 and 91 (i.e., for each pair of elements corresponding to each other in the registration-side selected element vector and the matching-side selected element vector) and counts the number of pixel positions judged to correspond to the areas effective for the similarity degree calculation.

Incidentally, pixel values of pixels belonging to a hidden area 95 in the matching image 90 and those of pixels belonging to an area 96 in the registered image corresponding to the hidden area 95 are not included in the matching-side selected element vector and the registration-side selected element vector, respectively. Therefore, the above judgment is not made for pixel positions in these areas 95 and 96.

Subsequently, the evaluation value correction means 5 corrects the evaluation value D of the similarity degree based on the square measure of the areas effective for the similarity degree calculation calculated in the step S501 (step S105b). In the step S105b, the evaluation value correction means 5 corrects the evaluation value D so that the increment of the evaluation value increases with the increase in the square measure of the areas effective for the similarity degree calculation. Then, the matching judgment means 6 matches the object represented by the matching image with the object represented by the registered image based on the evaluation value Dc after the correction (step S106). The steps S105b and S106 are equivalent to those in the fifth exemplary embodiment.

In this exemplary embodiment, pixel positions where the dispersion of the pixel value is great are determined from the matching image and the registered images, and the evaluation value D of the similarity degree is corrected so that the increment of the evaluation value increases with the increase in the square measure of such a set of pixels. Therefore, the aforementioned increase in the corrected evaluation value when the square measure of areas where the individuality of the object does not appear is large can be prevented and a highly accurate similarity degree can be determined. Consequently, the matching performance can be enhanced.

While the relative effective area determining means 12 is employed for the second exemplary embodiment in the above explanation of the sixth exemplary embodiment, it is also possible to employ the relative effective area determining means 12 for the third exemplary embodiment and make the correction of the evaluation value in the third exemplary embodiment based on the square measure of the areas (effective for the similarity degree calculation) determined by the relative effective area determining means 12.

Seventh Exemplary Embodiment

In a seventh exemplary embodiment, three-dimensional data is measured instead of photographing a two-dimensional image. A two-dimensional image is generated from the three-dimensional data and the similarity degree is calculated using the generated two-dimensional image. While three-dimensional data of an object as a target of the registration is measured in the following explanation, this exemplary embodiment may also be configured to perform the measurement of three-dimensional data for an object as a target of the matching.

Figure 24:
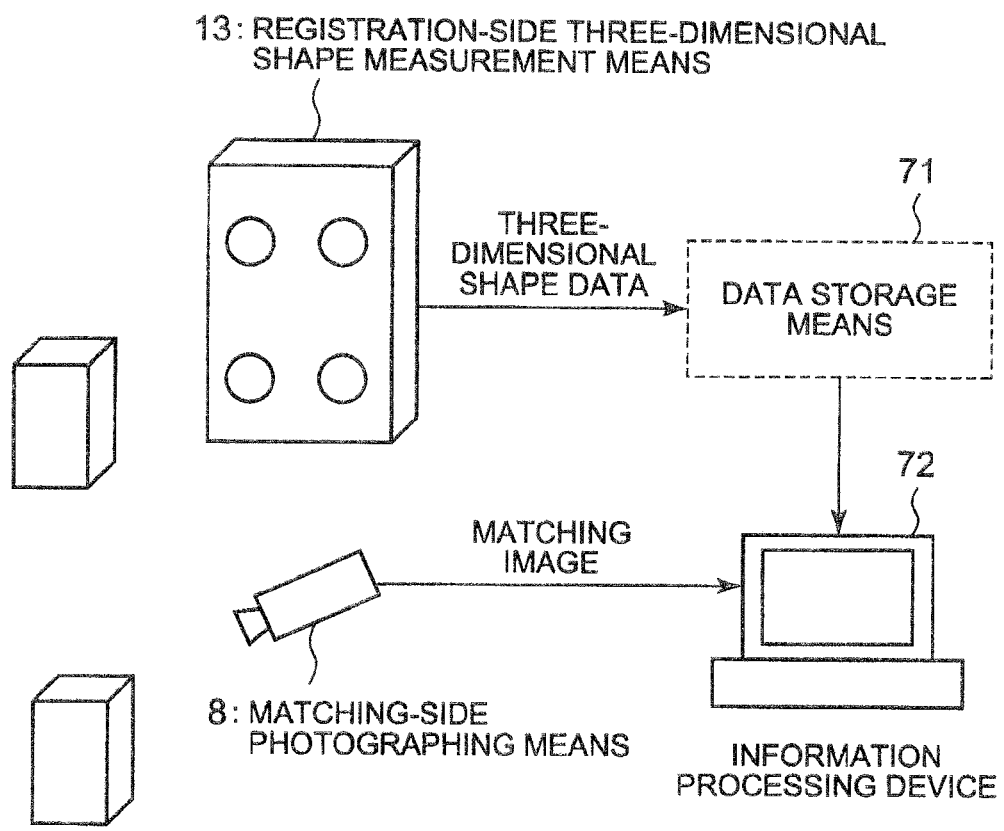
FIG. 24 It depicts an explanatory drawing showing the outline of a matching device in accordance with a seventh exemplary embodiment of the present invention.

FIG. 24 is an explanatory drawing showing the outline of a matching device in accordance with the seventh exemplary embodiment of the present invention. The matching device of the seventh exemplary embodiment comprises registration-side three-dimensional shape measurement means 13 for measuring the three-dimensional data of an object as a target of the registration, the matching-side photographing means 8, the data storage means 71 and the information processing device 72.

In this exemplary embodiment, the data storage means 71 stores three-dimensional shape data of an object. The registration-side three-dimensional shape measurement means 13 measures the three-dimensional shape of a registration target object and stores three-dimensional shape data representing the three-dimensional shape of the object in the data storage means 71. The matching-side photographing means 8 generates the matching image by photographing a matching target object similarly to the second exemplary embodiment. In this exemplary embodiment, the information processing device 72 generates an image of the registration target object that matches the direction of the object (matching target object) and the status of illumination in the matching image from the three-dimensional shape data and then calculates the similarity degree between the matching image and the generated image.

Incidentally, the matching device of this exemplary embodiment may also be configured to comprise matching-side three-dimensional shape measurement means (not shown in figures) for measuring three-dimensional shape data of the matching target object and registration-side photographing means (not shown in FIG. 24) for generating the registered image by photographing the registration target object. In this case, the information processing device 72 may generate an image (matching image) of the matching target object that matches the direction of the object (registration target object) and the status of illumination in the registered image from the three-dimensional shape data and then calculate the similarity degree between the matching image and the registered image.

Figure 25:
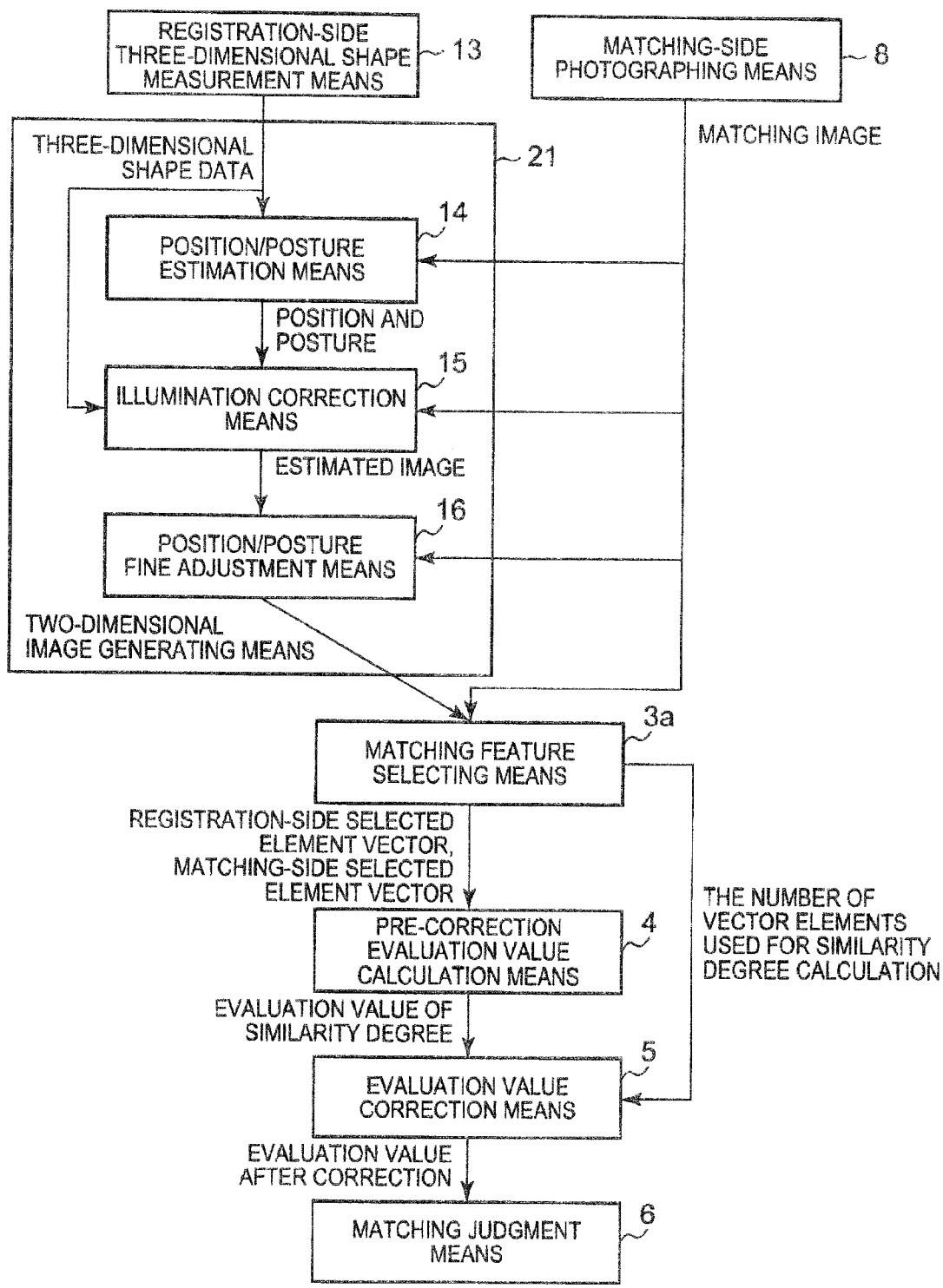
FIG. 25 It depicts a block diagram showing an example of the configuration of the matching device of the seventh exemplary embodiment.

FIG. 25 is a block diagram showing an example of the configuration of the matching device of the seventh exemplary embodiment. Components equivalent to those in the second exemplary embodiment are assigned the same reference character as in FIG. 8 and detailed explanation thereof is omitted. The matching device of the seventh exemplary embodiment comprises the registration-side three-dimensional shape measurement means 13, two-dimensional image generating means 21, the matching-side photographing means 8, the matching feature selecting means 3a, the pre-correction evaluation value calculation means 4, the evaluation value correction means 5 and the matching judgment means 6.

The registration-side three-dimensional shape measurement means 13 measures the three-dimensional shape of a registration target object and stores the three-dimensional shape data of the object in the data storage means 71. The registration-side three-dimensional shape measurement means 13 may generate the three-dimensional data by the method described in the Non-patent Literature 6, for example. The registration-side three-dimensional shape measurement means 13 may be implemented by a three-dimensional scanner.

The two-dimensional image generating means 21 generates a two-dimensional image representing the object from the three-dimensional data stored in the data storage means 71. In this case, the two-dimensional image generating means 21 generates the two-dimensional image so that the object in the generated two-dimensional image and the object in the other image (the matching image in this example) face substantially the same direction and the status of illumination on each object becomes similar. In the following, the two-dimensional image generating means 21 will be explained in more detail. The two-dimensional image generating means 21 includes position/posture estimation means 14, illumination correction means 15 and position/posture fine adjustment means 16.

The position/posture estimation means 14 estimates the position/posture of the object (e.g., the direction of the face) as a photographing condition at the instant when the matching image was photographed. In other words, the position/posture estimation means 14 estimates position/posture of the object (registration target object) represented by the three-dimensional shape data (hereinafter referred to as a "three-dimensional object") that is equivalent to the position/posture of the object (matching target object) in the matching image. The position/posture estimation means 14 may estimate the position/posture of the object by the method described in the Non-patent Literature 7. An example of the position/posture estimation by the position/posture estimation means 14 will be explained below. The position/posture estimation means 14 estimates the positions of characteristic parts of the object (e.g., tails of the eyes in the face) from the matching image. For example, the position/posture estimation means 14 may prestore pattern information representing pixel patterns of the characteristic parts and detect positions that match the pattern information from the matching image. Then, the position/posture estimation means 14 estimates the position/posture of the object in the matching image based on geometrical information (positional relationship) on the positions of the characteristic parts. The position/posture estimation means 14 presumes that the position/posture of the three-dimensional object also equals the estimated position/posture. The position/posture estimation means 14 outputs parameters representing the estimated position/posture to the illumination correction means 15.

The illumination correction means 15 generates a two-dimensional image of the three-dimensional object in the position/posture represented by the parameters inputted from the position/posture estimation means 14 and in an illumination condition the most approximate to that in the matching image. For example, as described in the Patent Literature 2, the illumination correction means 15 may determine the base vectors of the illumination variation space and express the variations in the image of the three-dimensional object in a variety of illumination status by the sum of the base vectors. The illumination correction means 15 may calculate the differences of pixel values between the matching image and each image of the three-dimensional object in a variety of illumination status and select an image in an illumination status that minimizes the differences, for example.

The position/posture fine adjustment means 16 finely adjusts the position/posture of the three-dimensional object in the image which has been generated as the image in the illumination condition the most approximate to that in the matching image so that the position/posture becomes approximate to that in the matching image. For implementing the approximation, the technique described in the Patent Literature 2, etc. can be used, for example. The position/posture fine adjustment means 16 may also successively generate images by slightly changing the position/posture of the three-dimensional object in the image generated by the illumination correction means 15, calculate the differences of pixel values between the matching image and each of the generated images, and select an image that minimizes the differences. Incidentally, the illumination condition is kept equal to that in the image generated by the illumination correction means 15. The position/posture fine adjustment means 16 outputs the two-dimensional image after the fine posture adjustment to the matching feature selecting means.

The matching feature selecting means 3a, the pre-correction evaluation value calculation means 4, the evaluation value correction means 5 and the matching judgment means 6 are equivalent to those in the second exemplary embodiment.

The two-dimensional image generating means 21 including the position/posture estimation means 14, the illumination correction means 15 and the position/posture fine adjustment means 16 is implemented by, for example, a CPU operating according to a matching program. In this case, the CPU operates as the position/posture estimation means 14, the illumination correction means 15, the position/posture fine adjustment means 16, etc. according to the matching program. It is also possible to implement each means by a separate hardware module.

Figure 26:
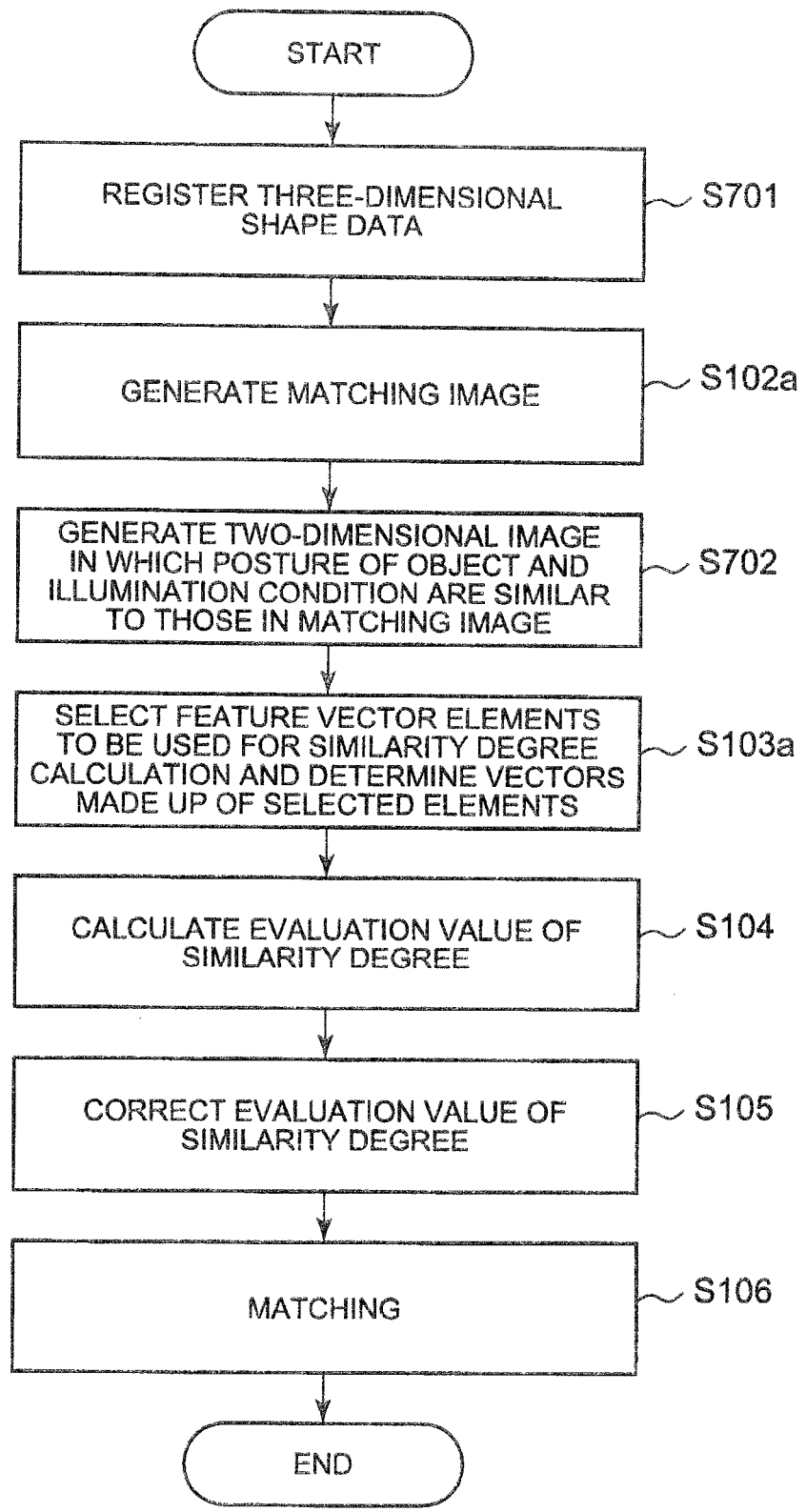
FIG. 26 It depicts a flow chart showing an example of a process flow in the seventh exemplary embodiment.

Next, the operation of the seventh exemplary embodiment will be described. FIG. 26 is a flow chart showing an example of a process flow in the seventh exemplary embodiment, wherein steps equivalent to those in the second exemplary embodiment are assigned the same reference characters as in FIG. 6.

The registration-side three-dimensional shape measurement means 13 measures the three-dimensional shape of an object as a target of the registration and stores the three-dimensional shape data of the object in the data storage means 71 (not shown in FIG. 25, see FIG. 24). Thereafter, the matching-side photographing means 8 photographs an object as a target of the matching and thereby generates the matching image (step S102a). The matching-side photographing means 8 outputs the matching image to the position/posture estimation means 14, the illumination correction means 15, the position/posture fine adjustment means 16 and the matching feature selecting means 3a.

Subsequently, the two-dimensional image generating means 21 generates a two-dimensional image of the three-dimensional object (represented by the three-dimensional data) in which the position/posture of the object and the illumination condition are similar to those in the matching image (step S702).

In the step S702, the position/posture estimation means 14 estimates the positions of characteristic parts of the object from the matching image, estimates the position/posture of the object in the matching image based on geometrical information on the positions of the characteristic parts, and presumes that the position/posture of the three-dimensional object also equals the estimated position/posture. Subsequently, the illumination correction means 15 generates an image ("estimated image") of the three-dimensional object in the estimated position/posture and in an illumination condition the most approximate to that in the matching image. The position/posture fine adjustment means 16 generates an image in which the position/posture of the three-dimensional object in the estimated image has been finely adjusted to be approximate to that in the matching image, and outputs the generated image to the matching feature selecting means 3a. This image corresponds to the registered image in the second exemplary embodiment.

The matching feature selecting means 3a determines the registration-side selected element vector and the matching-side selected element vector from the image (registered image) inputted from the position/posture fine adjustment means 16 and the matching image, while also determining the number of vector elements used for the similarity degree calculation (step S103a). The steps from this step S103a (steps S103a-S106) are equivalent to those in the second exemplary embodiment, and thus repeated explanation thereof is omitted.

Also in this exemplary embodiment, the correction is made similarly to the second exemplary embodiment. Therefore, the similarity degree between the matching image and the two-dimensional image generated from the three-dimensional data can be determined with high accuracy and the matching performance can be improved.

While the process after the two-dimensional image is generated by the two-dimensional image generating means 21 is executed similarly to the second exemplary embodiment in the above explanation of the seventh exemplary embodiment, the process after the generation of the two-dimensional image by the two-dimensional image generating means 21 may also be executed similarly to the third, fourth, fifth or sixth exemplary embodiment.

In the second through sixth exemplary embodiments, the matching device may also be equipped with the registration-side three-dimensional shape measurement means 13 and matching-side three-dimensional shape measurement means (not shown in figures) instead of the registration-side photographing means 7 and the matching-side photographing means 8 and determine the registration-side selected element vector and the matching-side selected element vector based on three-dimensional data of the registration target object and three-dimensional data of the matching target object. In short, the matching device in each exemplary embodiment may execute the process by use of three-dimensional data instead of two-dimensional images.

In the seventh exemplary embodiment, the matching device may also acquire three-dimensional shape data of the registration target object and the matching target object and thereafter generate the registered image and the matching image based on corresponding pieces of the three-dimensional data while equalizing the position/posture and the illumination condition in the images.

Figure 27:
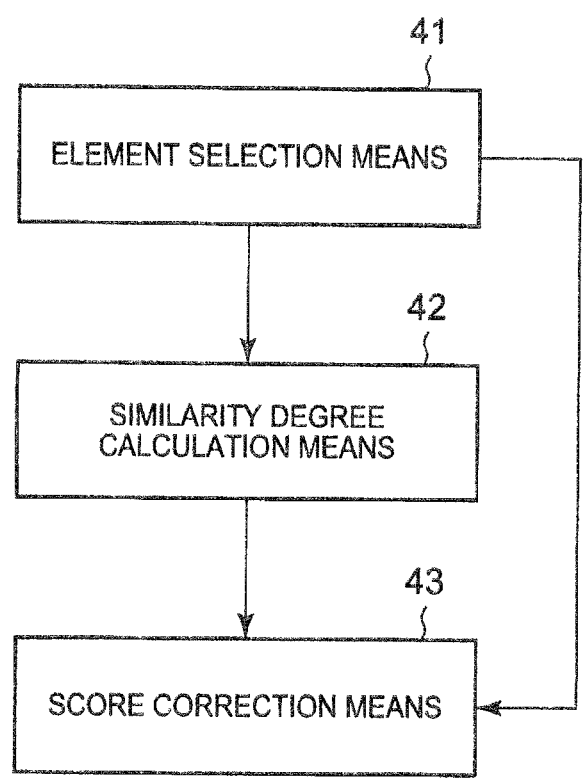
FIG. 27 It depicts is a block diagram showing the minimum configuration of the present invention.
Figure 28:
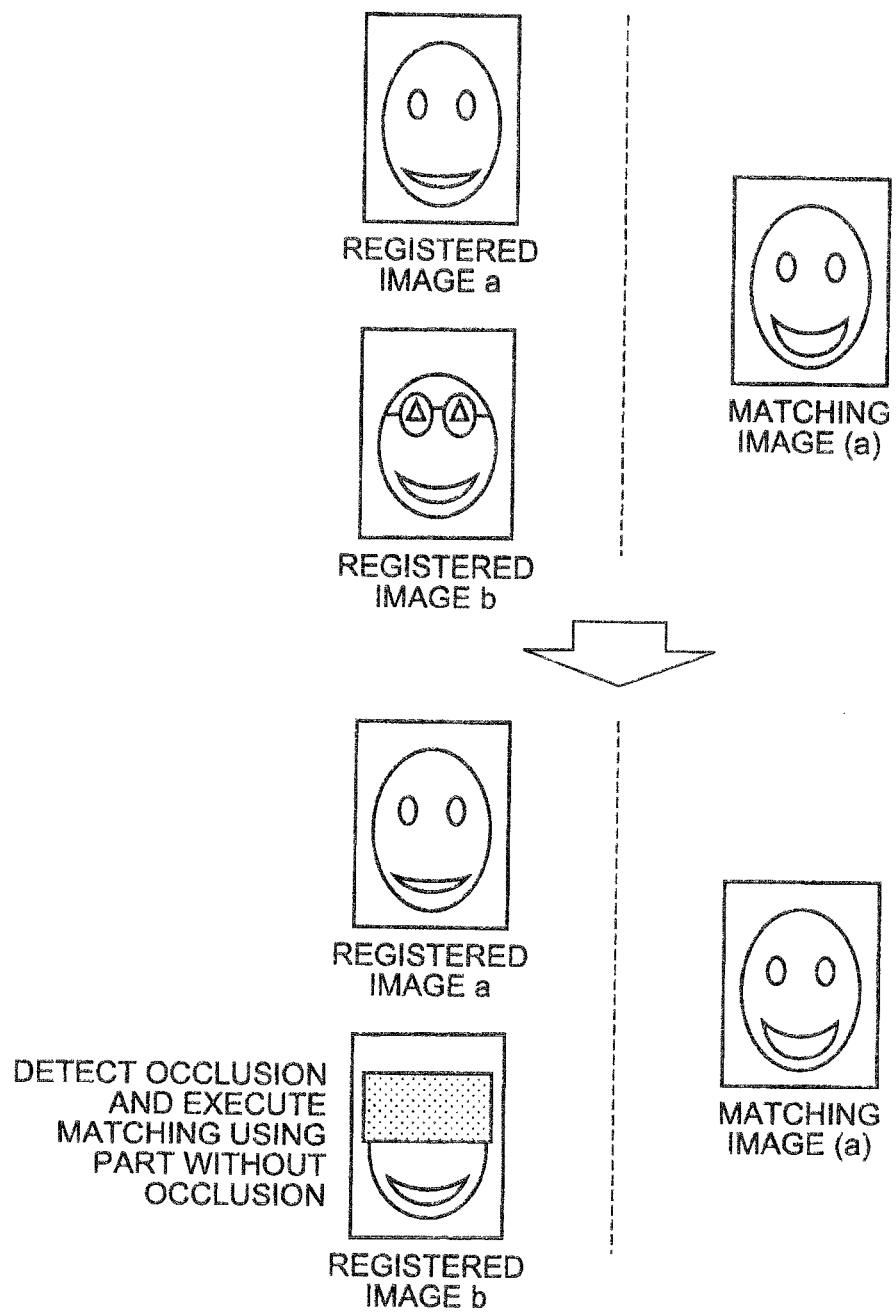
FIG. 28 It depicts a conceptual diagram showing an example of a case where a correct matching result can not be obtained when square measures used for the matching are small.

Next, the minimum configuration of the present invention will be described. FIG. 27 is a block diagram showing the minimum configuration of the present invention. The matching device in accordance with the present invention comprises element selection means 41, similarity degree calculation means 42 and score correction means 43.

The element selection means 41 (e.g., the matching feature selecting means 3, 3a) selects elements corresponding to each other between a first vector including a plurality of elements determined based on first data and a second vector including a plurality of elements determined based on second data.

The similarity degree calculation means 42 (e.g., the pre-correction evaluation value calculation means 4) calculates a score of the degree of similarly between the first data and the second data from the elements selected from the first vector and the second vector.

The score correction means 43 (e.g., the evaluation value correction means 5) corrects the score calculated by the similarity degree calculation means 42 so that the increment of the score increases with the increase in the amount of data used for the calculation of the degree of similarly.

With such a configuration, the accuracy of the degree of similarly can be improved.

The above exemplary embodiments have disclosed matching devices having the following configurations:

(1) A matching device comprising:
element selection means (e.g., the matching feature selecting means 3, 3a) which selects elements corresponding to each other between a first vector including a plurality of elements determined based on first data and a second vector including a plurality of elements determined based on second data;

similarity degree calculation means (e.g., the pre-correction evaluation value calculation means 4) which calculates a score of the degree of similarly between the first data and the second data from the elements selected from the first vector and the second vector; and score correction means (e.g., the evaluation value correction means 5) which corrects the score calculated by the similarity degree calculation means so that the increment of the score increases with the increase in the amount of data used for the calculation of the degree of similarly.

(2) The matching device wherein the element selection means (e.g., the matching feature selecting means 3, 3a) makes the selection of the elements corresponding to each other between a first vector (e.g., the registration-side feature vector) determined based on a first image (e.g., the registered image) and a second vector (e.g., the matching-side feature vector) determined based on a second image (e.g., the matching image).

(3) The matching device wherein the score correction means corrects the score calculated by the similarity degree calculation means so that the increment of the score increases with the increase in the number of the elements selected by the element selection means.

(4) The matching device wherein the element selection means selects elements corresponding to pixels in areas that can be associated with each other between a first image and a second image (e.g., areas where the hiding has occurred in neither the registered image nor the matching image) from a first vector including pixel values of the first image as its elements and a second vector including pixel values of the second image as its elements.

(5) The matching device further comprising:

first feature extraction means (e.g., the registration-side feature extraction means 9 in the third exemplary embodiment) which executes feature extraction to a first image and determines a first vector representing the result of the feature extraction; and second feature extraction means (e.g., the matching-side feature extraction means 10 in the third exemplary embodiment) which executes feature extraction to a second image and determines a second vector representing the result of the feature extraction, wherein the element selection means makes the selection of the elements corresponding to each other from the first vector and the second vector.

(6) The matching device wherein:

the element selection means selects elements corresponding to pixels in areas that can be associated with each other between a first image and a second image from a first vector including pixel values of the first image as its elements and a second vector including pixel values of the second image as its elements, and the matching device further comprises:

first feature extraction means (e.g., the registration-side feature extraction means 9 in the fourth exemplary embodiment) which executes feature extraction to the elements selected from the first vector by the element selection means; and second feature extraction means (e.g., the matching-side feature extraction means 10 in the fourth exemplary embodiment) which executes feature extraction to the elements selected from the second vector by the element selection means, and the similarity degree calculation means calculates the score of the degree of similarly between the first data and the second data from the result of the feature extraction by the first feature extraction means and the second feature extraction means, and the score correction means corrects the score calculated by the similarity degree calculation means so that the increment of the score increases with the increase in square measure of the areas that can be associated with each other between the first image and the second image.

(7) The matching device further comprising effective area judgment means (e.g., the effective area determining means 11 or the relative effective area determining means 12) which judges areas effective for the calculation of the degree of similarly in a first image corresponding to the first data and a second image corresponding to the second data, wherein the score correction means corrects the score calculated by the similarity degree calculation means so that the increment of the score increases with the increase in square measure of the areas effective for the calculation of the degree of similarly.

(8) The matching device wherein the effective area judgment means (e.g., the effective area determining means 11) judges that a pixel in the first image and a pixel in the second image corresponding to each other belong to the areas effective for the calculation of the degree of similarly when pixel values of the pixels corresponding to each other satisfy a condition regarding a prescribed threshold value (e.g., the shadow-excluding threshold value and the highlight-excluding threshold value).

(9) The matching device wherein the effective area judgment means (e.g., the relative effective area determining means 12) calculates the degree of dispersion of pixel values for each group of pixels corresponding to one another in a given set of images including the first image corresponding to the first data and the second image corresponding to the second data and judges that the pixels for which the degree of dispersion has been calculated belong to the areas effective for the calculation of the degree of similarly when the degree of dispersion is a prescribed threshold value or higher.

(10) The matching device further comprising:

three-dimensional data generating means (e.g., the registration-side three-dimensional shape measurement means 13) which measures the three-dimensional shape of an object and generates three-dimensional shape data representing the three-dimensional shape of the object; and two-dimensional image generating means (e.g., the two-dimensional image generating means 21) which generates a two-dimensional image of the object represented by the three-dimensional shape data as a first image when a second image is given, so that posture of the object and illumination condition in the first image become similar to those in the second image.

(11) A matching device comprising:

an element selection unit (e.g., the matching feature selecting means 3, 3a) which selects elements corresponding to each other between a first vector including a plurality of elements determined based on first data and a second vector including a plurality of elements determined based on second data;

a similarity degree calculation unit (e.g., the pre-correction evaluation value calculation means 4) which calculates a score of the degree of similarly between the first data and the second data from the elements selected from the first vector and the second vector; and a score correction unit (e.g., the evaluation value correction means 5) which corrects the score calculated by the similarity degree calculation unit so that the increment of the score increases with the increase in the amount of data used for the calculation of the degree of similarly.

(12) The matching device wherein the element selection unit (e.g., the matching feature selecting means 3, 3*a*) makes the selection of the elements corresponding to each other between a first vector (e.g., the registration-side feature vector) determined based on a first image (e.g., the registered image) and a second vector (e.g., the matching-side feature vector) determined based on a second image (e.g., the matching image).

(13) The matching device wherein the score correction unit corrects the score calculated by the similarity degree calculation unit so that the increment of the score increases with the increase in the number of the elements selected by the element selection unit.

(14) The matching device wherein the element selection unit selects elements corresponding to pixels in areas that can be associated with each other between a first image and a second image (e.g., areas where the hiding has occurred in neither the registered image nor the matching image) from a first vector including pixel values of the first image as its elements and a second vector including pixel values of the second image as its elements.

(15) The matching device further comprising:

a first feature extraction unit (e.g., the registration-side feature extraction means 9 in the third exemplary embodiment) which executes feature extraction to a first image and determines a first vector representing the result of the feature extraction; and a second feature extraction unit (e.g., the matching-side feature extraction means 10 in the third exemplary embodiment) which executes feature extraction to a second image and determines a second vector representing the result of the feature extraction, wherein the element selection unit makes the selection of the elements corresponding to each other from the first vector and the second vector.

(16) The matching device wherein:

the element selection unit selects elements corresponding to pixels in areas that can be associated with each other between a first image and a second image from a first vector including pixel values of the first image as its elements and a second vector including pixel values of the second image as its elements, and the matching device further comprises:

a first feature extraction unit (e.g., the registration-side feature extraction means 9 in the fourth exemplary embodiment) which executes feature extraction to the elements selected from the first vector by the element selection unit; and a second feature extraction unit (e.g., the matching-side feature extraction means 10 in the fourth exemplary embodiment) which executes feature extraction to the elements selected from the second vector by the element selection unit, and the similarity degree calculation unit calculates the score of the degree of similarly between the first data and the second data from the result of the feature extraction by the first feature extraction unit and the second feature extraction unit, and the score correction unit corrects the score calculated by the similarity degree calculation unit so that the increment of the score increases with the increase in square measure of the areas that can be associated with each other between the first image and the second image.

(17) The matching device further comprising an effective area judgment unit (e.g., the effective area determining means 11 or the relative effective area determining means 12) which judges areas effective for the calculation of the degree of similarly in a first image corresponding to the first data and a second image corresponding to the second data, wherein the score correction unit corrects the score calculated by the similarity degree calculation unit so that the increment of the score increases with the increase in square measure of the areas effective for the calculation of the degree of similarly.

(18) The matching device wherein the effective area judgment unit (e.g., the effective area determining means 11) judges that a pixel in the first image and a pixel in the second image corresponding to each other belong to the areas effective for the calculation of the degree of similarly when pixel values of the pixels corresponding to each other satisfy a condition regarding a prescribed threshold value (e.g., the shadow-excluding threshold value and the highlight-excluding threshold value).

(19) The matching device wherein the effective area judgment unit (e.g., the relative effective area determining means 12) calculates the degree of dispersion of pixel values for each group of pixels corresponding to one another in a given set of images including the first image corresponding to the first data and the second image corresponding to the second data and judges that the pixels for which the degree of dispersion has been calculated belong to the areas effective for the calculation of the degree of similarly when the degree of dispersion is a prescribed threshold value or higher.

(20) The matching device further comprising:

a three-dimensional data generating unit (e.g., the registration-side three-dimensional shape measurement means 13) which measures the three-dimensional shape of an object and generates three-dimensional shape data representing the three-dimensional shape of the object; and a two-dimensional image generating unit (e.g., the two-dimensional image generating means 21) which generates a two-dimensional image of the object represented by the three-dimensional shape data as a first image when a second image is given, so that posture of the object and illumination condition in the first image become similar to those in the second image.

While the present invention has been described above with reference to the exemplary embodiments, the present invention is not to be restricted to the particular illustrative exemplary embodiments. A variety of modifications understandable to those skilled in the art can be made to the configuration and details of the present invention within the scope of the present invention.

This application claims priority to Japanese Patent Application No. 2009-104495 filed on Apr. 22, 2009, the entire disclosure of which is incorporated herein by reference.

INDUSTRIAL APPLICABILITY

The present invention is suitably applicable to matching devices for calculating the degree of similarly between data sets (e.g., images) for the matching between the data sets.

REFERENCE SIGNS LIST

1 registration means
2 input means
3, 3*a* matching feature selecting means
4 pre-correction evaluation value calculation means
5 evaluation value correction means
6 matching judgment means
7 registration-side photographing means 8 matching-side photographing means
9 registration-side feature extraction means
10 matching-side feature extraction means
11 effective area determining means
12 relative effective area determining means
13 registration-side three-dimensional shape measurement means
14 position/posture estimation means
15 illumination correction means
16 position/posture fine adjustment means
21 two-dimensional image generating means

The invention claimed is:

1. A matching device comprising:
an element selection unit implemented at least by a hardware and which selects elements corresponding to each other between a first feature vector representing features of an object and including a plurality of elements determined based on first data, and a second feature vector representing features of the object and including a plurality of elements determined based on second data;
a similarity degree calculation unit implemented at least by a hardware and which calculates a score of a degree of similarly between the first data and the second data from the elements selected from the first feature vector and the second feature vector;
a score correction unit implemented at least by a hardware and which corrects the score calculated by the similarity degree calculation unit so that the increment of the score increases with the increase in the amount of data used for the calculation of the degree of similarly;
a three-dimensional data generating unit implemented at least by a hardware and which measures a three-dimensional shape of the object and generates three-dimensional shape data representing the three-dimensional shape of the object; and
a two-dimensional image generating unit implemented at least by a hardware and which generates a two-dimensional image of the object represented by the three-dimensional shape data as a first image when a second image is given, so that posture of the object and illumination condition in the first image become similar to those in the second image,
wherein the element selection unit makes the selection of the elements corresponding to each other between the first feature vector determined based on the first image and the second feature vector determined based on the second image.

2. The matching device according to claim 1, wherein the score correction unit corrects the score calculated by the similarity degree calculation unit so that the increment of the score increases with the increase in the number of the elements selected by the element selection unit.

3. The matching device according to claim 1, wherein the element selection unit selects elements corresponding to pixels in areas that can be associated with each other between the first image and the second image from the first feature vector including pixel values of the first image as its elements and the second feature vector including pixel values of the second image as its elements.

4. The matching device according to claim 1, further comprising:
a first feature extraction unit implemented at least by a hardware and which executes feature extraction to the first image and determines the first feature vector representing the result of the feature extraction; and
a second feature extraction unit implemented at least by a hardware and which executes feature extraction to the second image and determines the second feature vector representing the result of the feature extraction,
wherein the element selection unit makes the selection of the elements corresponding to each other from the first feature vector and the second feature vector.

5. The matching device according to claim 1, wherein:
the element selection unit selects elements corresponding to pixels in areas that can be associated with each other between the first image and the second image from the first feature vector including pixel values of the first image as its elements and the second feature vector including pixel values of the second image as its elements, and
the matching device further comprises:
a first feature extraction unit implemented at least by a hardware and which executes feature extraction to the elements selected from the first feature vector by the element selection unit; and
a second feature extraction unit implemented at least by a hardware and which executes feature extraction to the elements selected from the second feature vector by the element selection unit, and
the similarity degree calculation unit implemented at least by a hardware and calculates the score of the degree of similarly between the first data and the second data from the result of the feature extraction by the first feature extraction unit and the second feature extraction unit, and
the score correction unit corrects the score calculated by the similarity degree calculation unit so that the increment of the score increases with the increase in square measure of the areas that can be associated with each other between the first image and the second image.

6. The matching device according to claim 1, further comprising an effective area judgment unit implemented at least by a hardware and which judges areas effective for the calculation of the degree of similarly in the first image corresponding to the first data and the second image corresponding to the second data,
wherein the score correction unit corrects the score calculated by the similarity degree calculation unit so that the increment of the score increases with the increase in square measure of the areas effective for the calculation of the degree of similarly.

7. The matching device according to claim 6, wherein the effective area judgment unit judges that a pixel in the first image and a pixel in the second image corresponding to each other belong to the areas effective for the calculation of the degree of similarly when pixel values of the pixels corresponding to each other satisfy a condition regarding a prescribed threshold value.

8. The matching device according to claim 6, wherein the effective area judgment unit calculates a degree of dispersion of pixel values for each group of pixels corresponding to one another in a given set of images including the first image corresponding to the first data and the second image corresponding to the second data and judges that the pixels for which the degree of dispersion has been calculated belong to the areas effective for the calculation of the degree of similarly when the degree of dispersion is a prescribed threshold value or higher.

9. A matching method, implemented by a processor, comprising:
selecting elements corresponding to each other between a first feature vector representing features of an object and including a plurality of elements determined based on first data, and a second feature vector representing features of the object and including a plurality of elements determined based on second data;

calculating a score of the degree of similarly between the first data and the second data from the elements selected from the first feature vector and the second feature vector;

correcting the calculated score so that the increment of the score increases with the increase in the amount of data used for the calculation of the degree of similarly;

measuring a three-dimensional shape of the object and generating three-dimensional shape data representing the three-dimensional shape of the object; and generating a two-dimensional image of the object represented by the three-dimensional shape data as a first image when a second image is given, so that posture of the object and illumination condition in the first image become similar to those in the second image, wherein the selection of the elements corresponding to each other is made between the first feature vector determined based on the first image and the second feature vector determined based on the second image.

10. The matching method according to claim 9, wherein the calculated score is corrected so that the increment of the score increases with the increase in the number of the selected elements.

11. The matching method according to claim 9, wherein elements corresponding to pixels in areas that can be associated with each other between the first image and the second image are selected from the first feature vector including pixel values of the first image as its elements and the second feature vector including pixel values of the second image as its elements.

12. The matching method according to claim 9, further comprising:

executing feature extraction to the first image and determining the first feature vector representing the result of the feature extraction; and executing feature extraction to the second image and determining the second feature vector representing the result of the feature extraction, wherein the selection of the elements corresponding to each other is made from the first feature vector and the second feature vector.

13. The matching method according to claim 9, wherein:

elements corresponding to pixels in areas that can be associated with each other between the first image and the second image are selected from the first feature vector including pixel values of the first image as its elements and the second feature vector including pixel values of the second image as its elements, and feature extraction is executed to the elements selected from the first feature vector, and feature extraction is executed to the elements selected from the second feature vector, and the score of the degree of similarly between the first data and the second data is calculated from the result of the feature extraction to the elements selected from the first feature vector and the result of the feature extraction executed to the elements selected from the second feature vector, and the calculated score is corrected so that the increment of the score increases with the increase in square measure of the areas that can be associated with each other between the first image and the second image.

14. The matching method according to claim 9, wherein:

areas effective for the calculation of the degree of similarly are judged in the first image corresponding to the first data and the second image corresponding to the second data, and the calculated score is corrected so that the increment of the score increases with the increase in square measure of the areas effective for the calculation of the degree of similarly.

15. The matching method according to claim 14, wherein a pixel in the first image and a pixel in the second image corresponding to each other are judged to belong to the areas effective for the calculation of the degree of similarly when pixel values of the pixels corresponding to each other satisfy a condition regarding a prescribed threshold value.

16. The matching method according to claim 14, wherein:

a degree of dispersion of pixel values is calculated for each group of pixels corresponding to one another in a given set of images including the first image corresponding to the first data and the second image corresponding to the second data, and the pixels for which the degree of dispersion has been calculated are judged to belong to the areas effective for the calculation of the degree of similarly when the degree of dispersion is a prescribed threshold value or higher.

17. A computer readable information recording medium storing matching program, when executed by a processor including a three-dimensional data generating unit implemented at least by a hardware and which measures a three-dimensional shape of an object and generates three-dimensional shape data representing the three-dimensional shape of the object, performs a method for:

element selection processing for selecting elements corresponding to each other between a first feature vector representing features of the object and including a plurality of elements determined based on first data and a second feature vector representing features of the object and including a plurality of elements determined based on second data;

similarity degree calculation processing for calculating a score of a degree of similarly between the first data and the second data from the elements selected from the first feature vector and the second feature vector;

score correction processing for correcting the score calculated by the similarity degree calculation processing so that the increment of the score increases with the increase in the amount of data used for the calculation of the degree of similarly; and two-dimensional image generating processing for generating a two-dimensional image of the object represented by the three-dimensional shape data as a first image when a second image is given, so that posture of the object and illumination condition in the first image become similar to those in the second image, wherein the program performs, in the element selection processing, to make the selection of the elements corresponding to each other between the first feature vector determined based on the first image and the second feature vector determined based on a second image.

18. The computer readable information recording medium according to claim 17, wherein the program performs, in the element selection processing, to correct the score calculated by the similarity degree calculation processing so that the increment of the score increases with the increase in the number of the elements selected by the element selection processing.

19. The computer readable information recording medium according claim 17, wherein the program performs, in the element selection processing, to select elements corresponding to pixels in areas that can be associated with each other between the first image and the second image from the first feature vector including pixel values of the first image as its elements and the second feature vector including pixel values of the second image as its elements.

20. The computer readable information recording medium according claim 17, the program further comprising:
   first feature extraction processing for executing feature extraction to the first image and determining the first feature vector representing the result of the feature extraction; and
   second feature extraction processing for executing feature extraction to the second image and determining the second feature vector representing the result of the feature extraction,
   wherein the program performs, in the element selection processing, to make the selection of the elements corresponding to each other from the first feature vector and the second feature vector.

21. The computer readable information recording medium according to claim 17, wherein the program performs,
   in the element selection processing, to select elements corresponding to pixels in areas that can be associated with each other between the first image and the second image from the first feature vector including pixel values of the first image as its elements and the second feature vector including pixel values of the second image as its elements, and
   the program further comprising:
      first feature extraction processing for executing feature extraction to the elements selected from the first feature vector by the element selection processing; and
      second feature extraction processing for executing feature extraction to the elements selected from the second feature vector by the element selection processing, and
   in the similarity degree calculation processing, to calculate the score of the degree of similarly between the first data and the second data from the result of the feature extraction by the first feature extraction processing and the second feature extraction processing, and
   in the score correction processing, to correct the score calculated by the similarity degree calculation processing so that the increment of the score increases with the increase in square measure of the areas that can be associated with each other between the first image and the second image.

22. The computer readable information recording medium according claim 17, the program further comprising: effective area judgment processing for judging areas effective for the calculation of the degree of similarly in the first image corresponding to the first data and the second image corresponding to the second data,
   wherein the program performs, in the score correction processing, to correct the score calculated by the similarity degree calculation processing so that the increment of the score increases with the increase in square measure of the areas effective for the calculation of the degree of similarly.

23. The computer readable information recording medium according to claim 22, wherein the program performs, in the effective area judgment processing, to judge that a pixel in the first image and a pixel in the second image corresponding to each other belong to the areas effective for the calculation of the degree of similarly when pixel values of the pixels corresponding to each other satisfy a condition regarding a prescribed threshold value.

24. The computer readable information recording medium according to claim 22, wherein the program performs, in the effective area judgment processing, to calculate a degree of dispersion of pixel values for each group of pixels corresponding to one another in a given set of images including the first image corresponding to the first data and the second image corresponding to the second data and judges that the pixels for which the degree of dispersion has been calculated belong to the areas effective for the calculation of the degree of similarly when the degree of dispersion is a prescribed threshold value or higher.

* * * * *